US010153933B2

United States Patent
Yang et al.

(10) Patent No.: US 10,153,933 B2
(45) Date of Patent: *Dec. 11, 2018

(54) METHOD AND APPARATUS FOR CONSTRUCTING VERY HIGH THROUGHPUT LONG TRAINING FIELD SEQUENCES

(71) Applicant: QUALCOMM Incorporated, San Diego, CA (US)

(72) Inventors: Lin Yang, San Diego, CA (US); Didier Johannes Richard Van Nee, Tull en 't Waal (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,643

(22) Filed: Apr. 6, 2017

(65) Prior Publication Data

US 2017/0230214 A1 Aug. 10, 2017

Related U.S. Application Data

(63) Continuation of application No. 14/538,629, filed on Nov. 11, 2014, now Pat. No. 9,756,526, which is a
(Continued)

(51) Int. Cl.
*H04L 27/26* (2006.01)
*H04W 52/32* (2009.01)
(Continued)

(52) U.S. Cl.
CPC ......... *H04L 27/262* (2013.01); *H04W 52/325* (2013.01); *H04B 7/0413* (2013.01); *H04W 84/12* (2013.01)

(58) Field of Classification Search
CPC .. H04L 27/262; H04W 52/325; H04W 84/12; H04B 7/0413
See application file for complete search history.

(56) References Cited

U.S. PATENT DOCUMENTS

| 7,315,580 B2 | 1/2008 | Feng et al. |
| 8,155,138 B2 | 4/2012 | Van Nee |

(Continued)

FOREIGN PATENT DOCUMENTS

| CN | 1849761 A | 10/2006 |
| CN | 1930843 A | 3/2007 |

(Continued)

OTHER PUBLICATIONS

Coffey S., et al., "IEEE P802.11 Wireless LANs. Joint Proposal: High throughput extension to the 802.11 Standard: PHY" IEEE, Piscataway, NJ, USA 0RD-0000-00-00, Jan. 10, 2006 (Jan. 10, 2006), pp. 1-32, XP040385527 pp. 8,12,13.

(Continued)

*Primary Examiner* — Chandrahas B Patel
(74) *Attorney, Agent, or Firm* — Arent Fox, LLP and Qualcomm, Incorporated

(57) ABSTRACT

Techniques are provided for constructing or determining a training sequence as a part of transmission preamble to minimize (or at least reduce) a peak-to-average power ratio (PAPR) at a transmitting node. In one example, a long training field (LTF) sequence of a preamble is determined that combines a set of interpolating sequences with LTF tone values. The LTF tone values may cover at least a portion of bandwidth of a first size, with each of the LTF tone values repeated for different subcarriers. The phases of tones of the LTF sequence may be rotated per bandwidth of the first size and certain tones of the LTF sequence may have a stream of values at pilot locations. For example, the phases of tones of
(Continued)

the LTF sequence may be rotated in an effort to reduce PAPR during a transmission of the LTF sequence.

14 Claims, 16 Drawing Sheets

Related U.S. Application Data continuation of application No. 13/037,915, filed on Mar. 1, 2011, now Pat. No. 8,917,784, which is a continuation-in-part of application No. 12/731,634, filed on Mar. 25, 2010, now Pat. No. 8,385,443.

(60) Provisional application No. 61/226,615, filed on Jul. 17, 2009, provisional application No. 61/321,330, filed on Apr. 6, 2010, provisional application No. 61/321,752, filed on Apr. 7, 2010, provisional application No. 61/323,775, filed on Apr. 13, 2010, provisional application No. 61/332,360, filed on May 7, 2010, provisional application No. 61/333,168, filed on May 10, 2010, provisional application No. 61/334,260, filed on May 13, 2010, provisional application No. 61/348,349, filed on May 26, 2010, provisional application No. 61/350,216, filed on Jun. 1, 2010, provisional application No. 61/354,898, filed on Jun. 15, 2010.

(51) Int. Cl.
*H04W 84/12* (2009.01)
*H04B 7/0413* (2017.01)

(56) References Cited

U.S. PATENT DOCUMENTS

| | | | |
|---|---|---|---|
| 8,385,443 | B2 | 2/2013 | Van Nee et al. |
| 8,917,784 | B2 | 12/2014 | Yang et al. |
| 8,917,785 | B2 | 12/2014 | Van Nee et al. |
| 2005/0078707 | A1 | 4/2005 | Maltsev et al. |
| 2005/0152473 | A1 | 7/2005 | Maltsev et al. |
| 2005/0286474 | A1 | 12/2005 | Van Zelst et al. |
| 2006/0018251 | A1 | 1/2006 | Park et al. |
| 2006/0182017 | A1 | 8/2006 | Hansen et al. |
| 2006/0245346 | A1 | 11/2006 | Bar-Ness et al. |
| 2007/0097946 | A1 | 5/2007 | Mujtaba |
| 2007/0253501 | A1 | 11/2007 | Yamaura |
| 2008/0049654 | A1 | 2/2008 | Otal et al. |
| 2008/0056393 | A1 | 3/2008 | Niu et al. |
| 2008/0186843 | A1 | 8/2008 | Ma et al. |
| 2009/0147870 | A1 | 6/2009 | Lin et al. |
| 2009/0190686 | A1 | 7/2009 | Cheong et al. |
| 2009/0219802 | A1 | 9/2009 | Han et al. |
| 2009/0296564 | A1 | 12/2009 | Kwon et al. |
| 2010/0080309 | A1 | 4/2010 | Moffatt et al. |
| 2011/0013607 | A1 | 1/2011 | Van Nee et al. |
| 2011/0194544 | A1 | 8/2011 | Yang et al. |
| 2013/0242963 | A1 | 9/2013 | Van Nee et al. |
| 2015/0063288 | A1 | 3/2015 | Yang et al. |

FOREIGN PATENT DOCUMENTS

| | | |
|---|---|---|
| CN | 101578833 A | 11/2009 |
| CN | 102474488 A | 5/2012 |
| EP | 2945336 A1 | 11/2015 |
| JP | 2007536875 A | 12/2007 |
| JP | 2008500783 A | 1/2008 |
| JP | 2009516416 A | 4/2009 |
| RU | 2349052 C2 | 3/2009 |
| TW | I255105 | 5/2006 |
| TW | 200644548 A | 12/2006 |
| TW | 200803346 A | 1/2008 |
| TW | 201012090 A | 3/2010 |
| WO | WO-2005119922 A2 | 12/2005 |
| WO | WO-2006001672 A1 | 1/2006 |
| WO | WO-2006132467 A1 | 12/2006 |
| WO | WO-2007055531 A2 | 5/2007 |
| WO | WO-2009022856 A2 | 2/2009 |
| WO | WO-2010021885 | 2/2010 |
| WO | WO-2011008776 A1 | 1/2011 |

OTHER PUBLICATIONS

Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009 (Mar. 1, 2009), pp. 1,2,276-297, XP002606795. IEEE P802.11n/D9.0 Retrieved from the Internet: URL:http://ieeexplore.ieee.org/stamp/stamp.jsp"tp=&arnumber=4810960 [retrieved on Oct. 25, 2010] pp. 1,2, 276-297; 24 pages.
European Search Report—EP15174478—Search Authority—Berlin—dated Sep. 21, 2015.
European Search Report—EP16159277—Search Authority—Berlin—dated Jun. 28, 2016.
Huber J.B., et al., "Reducing the peak-to-average Power Ratio of Multicarrier Modulation by Selected Mapping", Election. Letter, vol. 32, No. 22, pp. 2056 to 2057, Oct. 1996.
International Preliminary Report on Patentability—PCT/US2011/031449, The International Bureau of WIPO—Geneva, Switzerland—dated Oct. 9, 2012.
International Search Report and Written Opinion—PCT/US2010/041853, International Search Authority—European Patent Office—dated Nov. 8, 2010.
International Search Report and Written Opinion—PCT/US2011/031449, ISA/EPO—dated Jul. 13, 2011.
Kim Y., et al., "160 MHz Transmissions," IEEE 802.11-10/0774r0, IEEE, Jul. 2010, 25 Slides.
Lanante L., et al., "IEEE802.1 1 ac Preamble with Legacy 802.11 a/n Backward Compatibility", IEEE 802.11-9/0847r1, Nov. 18, 2009.
<span style="font-family: calibri;">Lanante L., et al., "IEEE802.11ac Preamble with Legacy 802.11a/n Backward Compatibility", IEEE 802.11-YY/0847R0, Jul. 14, 2009 (Jul. 14, 2009), pp. 1-18, XP002606794, Retrieved from the Internet: URL: http://www.google.de/url"sa=t&source=web&cd=3&ved=0CBgQFjAC&url=https%3A%2F%Fmentor.ieee.org%2F802.11%2Fdcn%2F10%2F11-10-0791-02-00ac-pha se-rotation-for-the-80-mhz-802-11ac-mixed-mode-packet.ppt&ei=u3bFT07TE8qh4QbZko26Aw&usg=AFQjCNHYliVl8HNnsZmesHd33saVGqWpOw [retrieved on Oct. 25, 2010] pp. 3-12.
Nee R.V., et al., "Preamble Parameters", IEEE 802.11-10-0578-01-00ac, May 17, 2010.
Saamer V, "VHT-LTF sequence for 80 MHz" IEEE 802.11-10/0802R0, [Online] Jul. 12, 2010 (Jul. 12, 2010), pp. 1-12, XP002616238, Retrieved from the Internet: URL:https://mentor.ieee.org/802.11/dcn/10/ II-10-0802-00-00ac-vht-ltf-sequence-for-80 -mhz.pptx> [retrieved on Jan. 10, 2011].
Sakaguchi Y., "Preamble Generation using Genetic Algorithm for MIMO WirelessLAN System," Technical Report of the Institute of Electronics, Information and Communication Engineers (IEICE), Jun. 2006, vol. 106, No. 96, SIS2006-19, pp. 37-42.
Shi K., et al., "Phase Tracking During VHT-LTF," IEEE 802.11-10/0771r0, IEEE, XP017676695, Jul. 2010, 19 Slides.
Srinivasa S., et al., "80MHz Tone Allocation", IEEE802.11-10/0370r0, Mar. 17, 2010.
Syafei W., et al., "A Gigabit MIMO WLAN system with international standardization strategy," Ntelligent Signal Processing and Communication Systems, 2009, 228-231.
Syafei W.A., et al., "A design of next generation Gigabit MIMO wireless LAN system", Advanced Communication Technology (ICACT), 2010 the 12th International Conference on, IEEE, Piscataway, NJ, USA, Feb. 7, 2010 (Feb. 7, 2010), pp. 941-946, XP031653679, ISBN: 978-1-4244-5427-3.

(56) References Cited

OTHER PUBLICATIONS

Taiwan Search Report—TW099123168—TIPO—dated Mar. 6, 2013.
Taiwan Search Report—TW100111869—TIPO—dated Nov. 10, 2013.

| Cases | min. PAPR [dB] | [c1 c2 c3 c4] | [ interp20Null, interp40Null, interp80ExtraL, interp80ExtraR ] |
|---|---|---|---|
| No Rotation 80Msps (IFFT 256) | 3.2163 | [1 -1 1 1] | 1 1 -1 -1 1 -1 -1 -1 1 -1 -1 -1 -1 -1 -1 1 1 1 -1 1 1 1 -1 -1 1 -1 1 1 -1 1 1 -1 |
| With Rotation 80Msps (IFFT 256) | 4.8262 | [1 -1 1 1] | 1 -1 1 -1 1 -1 -1 -1 1 -1 -1 -1 -1 -1 -1 1 1 1 -1 1 1 1 -1 -1 1 -1 1 1 -1 1 1 -1 |
| No Rotation 320Msps (IFFT 1024) | 4.4927 | [1 1 1 -1] | 1 1 -1 -1 1 -1 -1 -1 1 -1 -1 1 -1 -1 -1 -1 1 -1 1 1 1 1 -1 1 -1 -1 1 1 1 -1 1 1 |
| With Rotation 320Msps (IFFT 1024) | 5.0556 | [1 -1 1 1] | 1 -1 -1 -1 1 -1 1 1 1 -1 -1 -1 -1 -1 1 -1 1 1 1 1 1 -1 1 1 -1 -1 1 1 -1 1 1 1 |
| No Rotation 320Msps (IFFT 256 + 4x TDI) | 4.8443 | [1 -1 1 1] | 1 1 -1 -1 1 -1 -1 -1 -1 -1 -1 -1 -1 -1 1 1 1 1 -1 1 1 1 -1 -1 1 -1 1 1 -1 1 1 -1 |
| With Rotation 320Msps (IFFT 256 + 4x TDI) | 5.8916 | [j 1 -j 1] | 1 -1 -1 -1 1 -1 1 1 -1 -1 1 -1 1 1 -1 -1 1 -1 1 -1 1 1 1 1 -1 1 1 -1 1 1 1 1 |

FIG. 5A

| Cases | min. PAPR [dB] | [c1 c2 c3 c4] | [ interp40Null, interp80ExtraL, interp80ExtraR ] |
|---|---|---|---|
| No Rotation 80Msps (IFFT 256) | 3.6227 | [-1 1 1 1] or [j 1 -j 1] | [1 -1 1 1, 1 -1 -1 -1, -1 -1 -1 -1 -1] or [1 -1 1 1, 1 -1 -1 -1, -1 -1 -1 -1 -1] |
| With Rotation 80Msps (IFFT 256) | 4.8262 | [1 -1 1 1] | [1 -1 1 1, -1 -1 -1 1 1, 1 1 -1 1 -1] |
| No Rotation 320Msps (IFFT 1024) | 4.7460 | [1 -1 1 1] | [1 -1 1 1, 1 1, -1 1 1, -1 1 1] |
| With Rotation 320Msps (IFFT 1024) | 5.0556 | [1 -1 1 1] | [1 -1 1 1, -1 1 1, 1 1 1, 1 -1 1] |
| No Rotation 320Msps (IFFT 256 + 4x TDI) | 4.9956 | [1 -1 1 1] | [-1 1 1, 1 1 -1 1, 1 -1 -1 1] |
| With Rotation 320Msps (IFFT 256 + 4x TDI) | 5.7807 | [1 j -1 -j] | [1 1 1 -j, -1 1 1, 1 -1, -1 -1 -1] |

FIG. 5B

| Cases | min. PAPR [dB] | [c1 c2 c3 c4] | [interp40Null, interp80ExtraL, interp80ExtraR] |
|---|---|---|---|
| No Rotation 80Msps (IFFT 256) | 3.2110 | [1 1 1 -1] | [1 -1 1, 1 -1 -1 -1, 1 1 1 1] |
| With Rotation 80Msps (IFFT 256) | 5.0510 | [1 -1 1 1] | [1 -1 1, -1 1 1 1, 1 -1 1 1] |
| No Rotation 320Msps (IFFT 1024) | 4.6581 | [1 -1 1 1] | [1 -1 1, 1 1 1 1, -1 -1 -1 1] |
| With Rotation 320Msps (IFFT 1024) | 5.1870 | [1 -1 1 1] | [1 -1 1, -1 1 1 1, -1 1 -1 1] |
| No Rotation 320Msps (IFFT 256 + 4x TDI) | 5.1387 | [1 1 1 -1] | [1 -1 1, 1 -1 -1 1, 1 1 1 1] |
| With Rotation 320Msps (IFFT 256 + 4x TDI) | 5.7382 | [1 -1 1 1] | [1 -1 -1, -1 -1 -1 1, 1 1 1 1] |

FIG. 5C

| Cases | min. PAPR [dB] | [c1 c2 c3 c4] | [interp40Null, interp80ExtraL, interp80ExtraR] |
|---|---|---|---|
| No Rotation 80Msps (IFFT 256) | 3.5285 | [1 -1 1 1] | [-1 -1 1, 1 -1, -1 -1, -1 -1] |
| With Rotation 80Msps (IFFT 256) | 5.1791 | [j 1 -j 1] | [1 -1 1, -1 -1, -1 1, 1 -1] |
| No Rotation 320Msps (IFFT 1024) | 4.7828 | [1 1 1 -1] | [1 -1 1, 1 -1, 1 1, 1 -1] |
| With Rotation 320Msps (IFFT 1024) | 5.5019 | [j 1 j -1] | [-1 -1 1, -1 -1, 1 -1, 1 -1] |
| No Rotation 320Msps (IFFT 256 + 4x TDI) | 5.2236 | [j 1 -j 1] | [1 -1 1, -1 -1, -1 1, 1 1] |
| With Rotation 320Msps (IFFT 256 + 4x TDI) | 6.0705 | [j 1 -j 1] | [1 -1 1, 1 -1, 1 -1, -1 -1] |

FIG. 5D

| Cases | min. PAPR [dB] | [c1 c2 c3 c4] | [ interp40Null, interp80ExtraL ] |
|---|---|---|---|
| No Rotation 80Msps (IFFT 256) | 3.7109 | [1 1 1 -1] | |
| With Rotation 80Msps (IFFT 256) | 5.1791 | [j 1 -j 1] | [-1 -1 1, -1 1] |
| No Rotation 320Msps (IFFT 1024) | 4.9669 | [1 -1 1 1] | [1 -1 1, -1 -1] |
| With Rotation 320Msps (IFFT 1024) | 5.5019 | [j 1 j -1] | [-1 -1 -1, 1 -1] |
| No Rotation 320Msps (IFFT 256 + 4x TDI) | 5.4730 | [1 1 1 -1] | [-1 -1 -1, -1 1] |
| With Rotation 320Msps (IFFT 256 + 4x TDI) | 6.1686 | [j -1 -j 1] | [1 1 -1, 1 -1] |

FIG. 5E

| Cases | min. PAPR [dB] | [c1 c2 c3 c4] | [ interp40NullL, interp80ExtraL, interp80ExtraR, interp40NullR ] |
|---|---|---|---|
| No Rotation 80Msps (IFFT 256) | 3.2110 | [1 1 1 1 -1] | [1 -1 1, -1 -1 -1 -1, 1 1 1 1, 1 -1 1] |
| With Rotation 80Msps (IFFT 256) | 4.7797 | [1 -1 -1 1 1] or [-1 1 1 1 1] or [1 j -1 -j] | [-1 -1 1, -1 -1 -1 -1, 1 1 1 1, -1 -1 -1 -1 -1] or [-1 -1 1, 1 1 -1 -1, 1 1 1 1, -1 1 -1 -1] or [-1 -1 1, 1 1 1 -1, -1, -1 -1 1 1, -1 -1 1] |
| No Rotation 320Msps (IFFT 1024) | 4.6277 | [-1 1 1 1 1] | [-1 -1 1, 1 -1, 1 -1 1, 1 1 1 1, -1, -1 -1 -1 -1] |
| With Rotation 320Msps (IFFT 1024) | 5.0347 | [1 j 1 -j] | [1 -1 1, 1 1 -1 -1, -1 1 1 1, 1 -1 -1 -1] |
| No Rotation 320Msps (IFFT 256 + 4x TDI) | 5.0475 | [j 1 -j 1] | [1 -1 1, 1 -1 -1 -1, -1 1 1 1, 1 -1 1 -1] |
| With Rotation 320Msps (IFFT 256 + 4x TDI) | 5.7242 | [1 -1 1 1] | [1 -1 1, -1 1 1 1, -1 1 1 1, 1 -1 -1 -1] |

FIG. 5F

| Cases | min. PAPR [dB] | [c1 c2 c3 c4] | [ interp40NullL, interp80ExtraL, interp80ExtraR, interp40NullR ] |
|---|---|---|---|
| No Rotation 80Msps (IFFT 256) | 3.2110 | [ 1 1 1 -1 ] | [ 1 -1 1, 1 -1 -1 -1, 1 1 1 1, 1 -1 1 ] |
| With Rotation 80Msps (IFFT 256) | 4.7797 | [ 1 -1 1 1 1 ] or [-1 1 1 1 1] or [ 1 j -1 -j ] | [ 1 -1 1, -1 -1 -1 -1, 1 1 1 1, -1 -1 -1 ] or [-1 1 1, 1 -1 -1 1, -1 1 1 1, 1 -1 -1 -1 ] or [ 1 -1 1, 1 -1 -1 -1, -1 1 1 1, 1 -1 1 ] |
| No Rotation 320Msps (IFFT 1024) | 4.4777 | [ 1 1 1 -1 1 ] | [ 1 -1 1, -1 -1 -1 1, -1 1 1 1, 1 -1 1 ] |
| With Rotation 320Msps (IFFT 1024) | 5.0287 | [ 1 -1 1 1 1 ] or [-1 1 1 1 1 ] | [ 1 -1 1, -1 -1 -1 -1, 1 1 1 1, 1 -1 -1 -1 ] or [-1 1 1-, 1 -1 -1 1, -1 1 1 1, 1 -1 -1 -1 ] |
| No Rotation 320Msps (IFFT 256 + 4x TDI) | 5.0475 | [ j 1 -j 1 ] | [ 1 -1 1, 1 -1 -1 -1, 1 1 1 1, 1 -1 1 -1 ] |
| With Rotation 320Msps (IFFT 256 + 4x TDI) | 5.7242 | [ 1 1 1 1 ] | [ 1 -1 1, 1 -1 -1 -1, 1 1 1 1, -1 -1 -1 ] |

FIG. 5G

| Cases | min. PAPR [dB] | [c1 c2 c3 c4] | [ interp40Null, interp80ExtraL, interp80ExtraR ] |
|---|---|---|---|
| No Rotation 80Msps (IFFT 256) | 3.2110 | [ 1 1 1 -1 ] | [ 1 -1 1, 1 -1 -1 -1, 1 1 1 1 ] |
| With Rotation 80Msps (IFFT 256) | 5.0510 | [ 1 -1 1 1 ] | [ 1 -1 1, 1 -1 -1 -1, 1 1 -1 1 ] |
| No Rotation 320Msps (IFFT 1024) | 4.7211 | [ 1 ] j 1 -j ] | [ 1 -1 1, 1 -1 -1 -1, 1 1 1 1 ] |
| With Rotation 320Msps (IFFT 1024) | 5.0510 | [ 1 -1 1 1 ] | [ 1 -1 1, 1 -1 -1 -1, 1 1 -1 1 ] |
| No Rotation 320Msps (IFFT 256 + 4x TDI) | 5.1387 | [ 1 1 1 -1 ] | [ 1 -1 1, 1 -1 -1 -1, 1 1 1 1 ] |
| With Rotation 320Msps (IFFT 256 + 4x TDI) | 5.7382 | [ 1 1 1 1 ] | [ 1 -1 1, -1 -1 -1 -1, 1 1 -1 1 ] |

FIG. 5H

| Cases | min. PAPR [dB] | [c1 c2 c3 c4] | [ interp40NullL, interp80ExtraL, interp80ExtraR ] |
|---|---|---|---|
| No Rotation 80Msps (IFFT 256) | 3.2542 | [ 1 1 -1 1 ] | [ 1 -1 -1, 1 -1 -1 -1 1, 1 -1 1 1 ] |
| With Rotation 80Msps (IFFT 256) | 5.0293 | [ 1 j 1 j ] | [ 1 1 -1, 1 1 1 -1, -1 -1 1 1 ] |
| No Rotation 320Msps (IFFT 1024) | 4.7652 | [ -1 1 1 1 ] | [ -1 1 1, 1 -1 -1 -1, 1 -1 -1 -1 ] |
| With Rotation 320Msps (IFFT 1024) | 5.0998 | [ j 1 1 1 ] | [ 1 1 1, 1 -1 -1 -1, 1 1 1 -1 ] |
| No Rotation 320Msps (IFFT 256 + 4x TDI) | 4.9746 | [ j 1 j-1 ] | [ 1 -1 -1, 1 -1 1 1, 1 -1 1 -1 ] |
| With Rotation 320Msps (IFFT 256 + 4x TDI) | 5.8677 | [ 1 j-1 -j ] | [ 1 1 1, 1 -1 -1 -1, 1 1 1 1 ] |

FIG. 5I

| Cases | min. PAPR [dB] | [c1 c2 c3 c4] | [ interp40NullL, interp80ExtraL, interp80ExtraR, interp40NullR ] |
|---|---|---|---|
| No Rotation 80Msps (IFFT 256) | 3.2110 | [ 1 1 1 -1 ] | [ 1 -1 1, 1 -1 -1 -1, 1 1 1 1, 1 -1 -1 -1 ] |
| With Rotation 80Msps (IFFT 256) | 4.7797 | [ 1 -1 1 1 ] or [ -1 1 1 1 ] | [ 1 1 -1, 1 1 1 1 -1, 1 -1 -1 1, 1 -1 -1 -1 ] or [ 1 1 1 -1, 1 -1 -1 -1, 1 1 -1 1, 1 -1 -1 -1 ] |
| No Rotation 320Msps (IFFT 1024) | 4.4777 | [ 1 1 -1 1 ] | [ 1 1 -1, 1 1 -1 -1 1, 1 -1 -1 -1, 1 1 -1 -1 ] |
| With Rotation 320Msps (IFFT 1024) | 5.0287 | [ 1,1 -1 1 1 ] or [ -1 1 1 1 ] | [ 1 1 -1, 1 -1 -1 1, 1 -1 -1 -1, 1 -1 -1 -1 ] or [ 1 1 -1, 1 1 -1 -1 -1, 1 1 1 -1, 1 -1 -1 -1 ] |
| No Rotation 320Msps (IFFT 256 + 4x TDI) | 4.8019 | [ j 1 -j 1 ] | [ 1 1 1, 1 -1 -1 1, 1 -1 -1 -1, 1 1 1 -1 ] |
| With Rotation 320Msps (IFFT 256 + 4x TDI) | 5.7242 | [ 1 -1 1 1 ] | [ 1 -1 1, 1 -1 -1 1, -1 -1 1, 1 -1 -1 -1 ] |

| Pilot Tones | -103 | -75 | -39 | -11 | 11 | 39 | 75 | 103 |
|---|---|---|---|---|---|---|---|---|
| values | -1 | 1 | 1 | 1 | -1 | -1 | 1 | 1 |

FIG. 7A

| P values | 1 | -1 | $\exp(-j\pi/3)$ $\exp(-j5\pi/3)$ | $\exp(-j2\pi/3)$ $\exp(-j4\pi/3)$ |
|---|---|---|---|---|
| PAPR (4x os) | 5.70 dB | 5.64 dB | 6.30 dB | 6.40 dB |

FIG. 7B

| P values | 1 | -1 | $\exp(-j\pi/3)$ $\exp(-j5\pi/3)$ | $\exp(-j2\pi/3)$ $\exp(-j4\pi/3)$ |
|---|---|---|---|---|
| PAPR (4x os) | 4.61 dB | 6.18 dB | 5.16 dB | 5.82 dB |

FIG. 7C

| P values | 1 | -1 | $\exp(-j\pi/3)$ $\exp(-j5\pi/3)$ | $\exp(-j2\pi/3)$ $\exp(-j4\pi/3)$ |
|---|---|---|---|---|
| PAPR (4x os) | 6.2648 dB | 4.6073 dB | 5.5470 dB | 4.8248 dB |

FIG. 7D

| P values | 1 | -1 | exp(-jπ/3) exp(-j5π/3) | exp(-j2π/3) exp(-j4π/3) |
|---|---|---|---|---|
| PAPR (4x os) | 5.2094 dB | 5.9233 dB | 4.8658 dB | 5.6678 dB |

FIG. 7E

| P values | 1 | -1 | exp(-jπ/3) exp(-j5π/3) | exp(-j2π/3) exp(-j4π/3) |
|---|---|---|---|---|
| PAPR (4x os) | 6.2648 dB | 4.6073 dB | 5.5470 dB | 4.8248 dB |

FIG. 7F

| P values | 1 | -1 | exp(-jπ/3) exp(-j5π/3) | exp(-j2π/3) exp(-j4π/3) |
|---|---|---|---|---|
| PAPR (4x os) | 6.2648 dB | 4.6073 dB | 5.570 dB | 4.8248 dB |

FIG. 7G

| P values | 1 | -1 | exp(-jπ/3) exp(-j5π/3) | exp(-j2π/3) exp(-j4π/3) |
|---|---|---|---|---|
| PAPR (4x os) | 5.2094 dB | 5.9233 dB | 4.8658 dB | 5.6678 dB |

FIG. 7H

| P values | 1 | -1 | exp(-jπ/3) exp(-j5π/3) | exp(-j2π/3) exp(-j4π/3) |
|---|---|---|---|---|
| PAPR (4x os) | 4.83 dB | 4.90 dB | 4.89 dB | 5.07 dB |

| Oversampled by IFFT 1024 | min. PAPR [dB] | Rotation Pattern |
|---|---|---|
| Case 1: c = [c(1) c(2) c(3) c(4)] | 5.3962 | [-1 1 1 1] |
| Case 2: c = [a a*j b b*j] | 6.8980 | [ 1 j 1 j] |
| Case 3: c = [1 j e d] | 5.4336 | [ 1 j 1 -j] or [ 1 j -1 j] |
| Case 4: c = [1 j b b*j] | | |
| where b = QBPSK | 6.8980 | [ 1 j 1 j] |
| where b = QPSK | 7.7188 | [1 j exp(j*pi/4) exp(j*3*pi/4)] |
| where b = 16QAM | 7.2347 | [1 j exp(j*pi/4)/sqrt(5) exp(j*3*pi/4)/sqrt(5)] |
| where b = 64QAM | 6.5175 | [1 j exp(j*pi/4)/sqrt(21) exp(j*3*pi/4)/sqrt(21)] |
| where b = 256QAM | 6.0093 | [1 j exp(j*pi/4)/sqrt(85) exp(j*3*pi/4)/sqrt(85)] |

FIG. 10A

| Oversampled by IFFT 1024 | min. PAPR [dB] | Rotation Pattern |
|---|---|---|
| Case 1: c = [c(1) c(2) c(3) c(4)] | 4.3480 | [-1 1 1 1] or [ 1 1 1 -1] |
| Case 2: c = [a a*j b b*j] | 5.8219 | [ 1 j 1 j] |
| Case 3: c = [1 j e d] | 4.4722 | [ 1 j -1 j] or [ 1 j 1 -j] |
| Case 4: c = [1 j b b*j] | | |
| where b = QBPSK | 5.8219 | [ 1 j 1 j] |
| where b = QPSK | 6.6706 | [1 j exp(j*pi/4) exp(j*3*pi/4)] |
| where b = 16QAM | 6.1535 | [1 j exp(-j*atan(1/3)) j*exp(-j*atan(1/3))] |
| where b = 64QAM | 5.4693 | [1 j exp(j*pi/4)/sqrt(21) exp(j*3*pi/4)/sqrt(21)] |
| where b = 256QAM | 4.9907 | [1 j exp(j*atan(1/3))/sqrt(17) j*exp(j*atan(1/3))/sqrt(17)] |

FIG. 10B

METHOD AND APPARATUS FOR CONSTRUCTING VERY HIGH THROUGHPUT LONG TRAINING FIELD SEQUENCES

CLAIM OF PRIORITY UNDER 35 U.S.C. § 119

The present application is a continuation application of U.S. patent application Ser. No. 14/538,629 filed Nov. 11, 2014, which was a continuation of patent application Ser. No. 13/037,915 filed on Mar. 1, 2011, which is a continuation-in-part of patent application Ser. No. 12/731,634 filed Mar. 25, 2010, which claims benefit of Provisional Application Ser. No. 61/226,615 filed Jul. 17, 2009 and assigned to the assignee hereof and hereby expressly incorporated by reference herein. U.S. patent application Ser. No. 13/037,915 filed on Mar. 1, 2011 also claims benefit of Provisional Application Ser. No. 61/321,330 filed Apr. 6, 2010, Provisional Application Ser. No. 61/321,752 filed Apr. 7, 2010, Provisional Application Ser. No. 61/323,775 filed Apr. 13, 2010, Provisional Application Ser. No. 61/332,360 filed May 7, 2010, Provisional Application Ser. No. 61/333,168 filed May 10, 2010, Provisional Application Ser. No. 61/334,260 filed May 13, 2010, Provisional Application Ser. No. 61/348,349 filed May 26, 2010, Provisional Application Ser. No. 61/350,216 filed Jun. 1, 2010, and Provisional Application Ser. No. 61/354,898 filed Jun. 15, 2010, and assigned to the assignee hereof and hereby expressly incorporated by reference herein.

BACKGROUND

Field

Certain aspects of the present disclosure generally relate to wireless communications and, more particularly, to a method and apparatus for constructing a long training field (LTF) sequence as a part of transmission preamble for Very High Throughput (VHT) wireless systems.

Background

The Institute of Electrical and Electronics Engineers (IEEE) 802.11 Wide Local Area Network (WLAN) standards body established specifications for transmissions based on the Very High Throughput (VHT) approach using a carrier frequency of 5 GHz (i.e., the IEEE 802.11ac specification), or using a carrier frequency of 60 GHz (i.e., the IEEE 802.11 ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A VHT Long Training Field (LTF) is a part of a transmission preamble, and can be utilized at a receiver side to estimate characteristics of underlying multiple-input multiple output (MIMO) wireless channel. Methods and apparatus are proposed in the present disclosure for constructing the VHT-LTF sequence, while providing a low peak-to-average power ratio (PAPR) at a transmitting node.

SUMMARY

Certain aspects of the present disclosure support a method for wireless communications. The method generally includes determining, at an apparatus, a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values; and transmitting the preamble by the apparatus.

Certain aspects of the present disclosure provide an apparatus for wireless communications. The apparatus generally includes a circuit configured to determine a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values; and a transmitter configured to transmit the preamble.

Certain aspects of the present disclosure provide an apparatus for wireless communications. The apparatus generally includes means for determining a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values; and means for transmitting the preamble.

Certain aspects of the present disclosure provide a computer-readable medium. The computer-readable medium includes a non-transitory computer-readable medium comprising instructions executable to: determine a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values; and transmit the preamble.

Certain aspects of the present disclosure provide a method for wireless communications. The method generally includes determining, at an apparatus, a long training field (LTF) sequence of a preamble that combines a plurality of interpolating sequences with LTF tone values, wherein the LTF tone values cover at least a portion of bandwidth of a first size, and each of the LTF tone values is repeated one or more times for different subcarriers, and wherein the plurality of interpolating sequences include extra tone values; rotating, at the apparatus, phases of tones of the LTF sequence per bandwidth of the first size during a transmission of the LTF sequence; and replacing tones of the LTF sequence at pilot locations with a defined stream of values.

Certain aspects of the present disclosure provide an apparatus for wireless communications. The apparatus generally includes a first circuit configured to determine a long training field (LTF) sequence of a preamble that combines a plurality of interpolating sequences with LTF tone values, wherein the LTF tone values cover at least a portion of bandwidth of a first size, and each of the LTF tone values is repeated one or more times for different subcarriers, and wherein the plurality of interpolating sequences include extra tone values; a second circuit configured to rotate phases of tones of the LTF sequence per bandwidth of the first size during a transmission of the LTF sequence; and a third circuit configured to replace tones of the LTF sequence at pilot locations with a defined stream of values.

Certain aspects of the present disclosure provide an access point. The access point generally includes at least one antenna; a first circuit configured to determine a long training field (LTF) sequence of a preamble that combines a plurality of interpolating sequences with LTF tone values, wherein the LTF tone values cover at least a portion of bandwidth of a first size, and each of the LTF tone values is repeated one or more times for different subcarriers, and wherein the plurality of interpolating sequences include extra tone values; a second circuit configured to rotate phases of tones of the LTF sequence per bandwidth of the first size during a transmission of the LTF sequence; a third circuit configured to replace tones of the LTF sequence at pilot locations with a defined stream of values; and a transmitter configured to transmit via the at least one antenna the LTF sequence within the preamble over a wireless channel by utilizing a bandwidth of a second size.

Certain aspects of the present disclosure provide a method for wireless communications. The method generally includes determining a long training field (LTF) sequence that combines a plurality of interpolating sequences and one or more other sequences repeated multiple times in an effort to reduce a peak-to-average power ratio (PAPR) during a transmission of the determined LTF sequence, and wherein the plurality of interpolating sequences include extra tone values; and transmitting the determined LTF sequence over a wireless channel by utilizing a bandwidth of a first size.

Certain aspects of the present disclosure provide an apparatus for wireless communications. The apparatus generally includes a circuit configured to determine a long training field (LTF) sequence that combines a plurality of interpolating sequences and one or more other sequences repeated multiple times in an effort to reduce a peak-to-average power ratio (PAPR) during a transmission of the determined LTF sequence, and wherein the plurality of interpolating sequences include extra tone values; and a transmitter configured to transmit the determined LTF sequence over a wireless channel by utilizing a bandwidth of a first size.

Certain aspects of the present disclosure provide a wireless node. The wireless node generally includes at least one antenna; a circuit configured to determine a long training field (LTF) sequence that combines a plurality of interpolating sequences and one or more other sequences repeated multiple times in an effort to reduce a peak-to-average power ratio (PAPR) during a transmission of the determined LTF sequence, and wherein the plurality of interpolating sequences include extra tone values; and a transmitter configured to transmit via the at least one antenna the determined LTF sequence over a wireless channel by utilizing a bandwidth of a first size.

Certain aspects of the present disclosure provide a method for wireless communications. The method generally includes determining a long training field (LTF) sequence that combines a plurality of interpolating sequences with LTF tone values associated with at least one of an Institute of Electrical and Electronics Engineers (IEEE) 802.11 in standard or an IEEE 802.11a standard, wherein the LTF tone values cover at least a portion of bandwidth of a first size, and each of the LTF tone values is repeated one or more times for different subcarriers, and wherein the plurality of interpolating sequences include extra tone values; rotating phases of tones of the LTF sequence per bandwidth of the first size in an effort to reduce a peak-to-average power ratio (PAPR) during a transmission of the LTF sequence; and transmitting the LTF sequence over a wireless channel by utilizing a bandwidth of a second size.

Certain aspects of the present disclosure provide an apparatus for wireless communications. The apparatus generally includes a first circuit configured to determine a long training field (LTF) sequence that combines a plurality of interpolating sequences with LTF tone values associated with at least one of an Institute of Electrical and Electronics Engineers (IEEE) 802.11n standard or an IEEE 802.11a standard, wherein the LTF tone values cover at least a portion of bandwidth of a first size, and each of the LTF tone values is repeated one or more times for different subcarriers, and wherein the plurality of interpolating sequences include extra tone values; a second circuit configured to rotate phases of tones of the LTF sequence per bandwidth of the first size in an effort to reduce a peak-to-average power ratio (PAPR) during a transmission of the LTF sequence; and a transmitter configured to transmit the LTF sequence over a wireless channel by utilizing a bandwidth of a second size.

Certain aspects of the present disclosure provide a wireless node. The wireless node generally includes at least one antenna; a first circuit configured to determine a long training field (LTF) sequence that combines a plurality of interpolating sequences with LTF tone values associated with at least one of an Institute of Electrical and Electronics Engineers (IEEE) 802.11n standard or an IEEE 802.11a standard, wherein the LTF tones values cover at least a portion of bandwidth of a first size, and each of the LTF tones values is repeated one or more times for different subcarriers, and wherein the plurality of interpolating sequences include extra tone values; a second circuit configured to rotate phases of tones of the LTF sequence per bandwidth of the first size in an effort to reduce a peak-to-average power ratio (PAPR) during a transmission of the LTF sequence; and a transmitter configured to transmit via the at least one antenna the LTF sequence over a wireless channel by utilizing a bandwidth of a second size.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A-5J illustrate examples of transmission peak-to-average power ratio (PAPR) results for preferred VHT-LTF sequences constructed for 80 MHz channel in accordance with certain aspects of the present disclosure.

FIG. 6 illustrates an example VHT-LTF sequence constructed in an effort to reduce PAPR in accordance with certain aspects of the present disclosure.

FIG. 7A illustrates an example values at pilot tones of VHT-LTF sequence chosen in an effort to reduce PAPR in accordance with certain aspects of the present disclosure.

FIGS. 7B-7I illustrate examples of PAPR results for different VHT-LTF sequences constructed for transmission over 80 MHz channel in accordance with certain aspects of the present disclosure FIGS. 8A-8C illustrate examples of VHT-LTF sequences constructed for transmission over 80 MHz channel in accordance with certain aspects of the present disclosure.

FIGS. 10A-10B illustrate examples minimal PAPR results for different phase rotation patterns applied for constructing Legacy Long Training Field (L-LTF) and Legacy Short Training Field (L-STF) of a VHT transmission preamble in accordance with certain aspects of the present disclosure.

DETAILED DESCRIPTION

Figure 1:
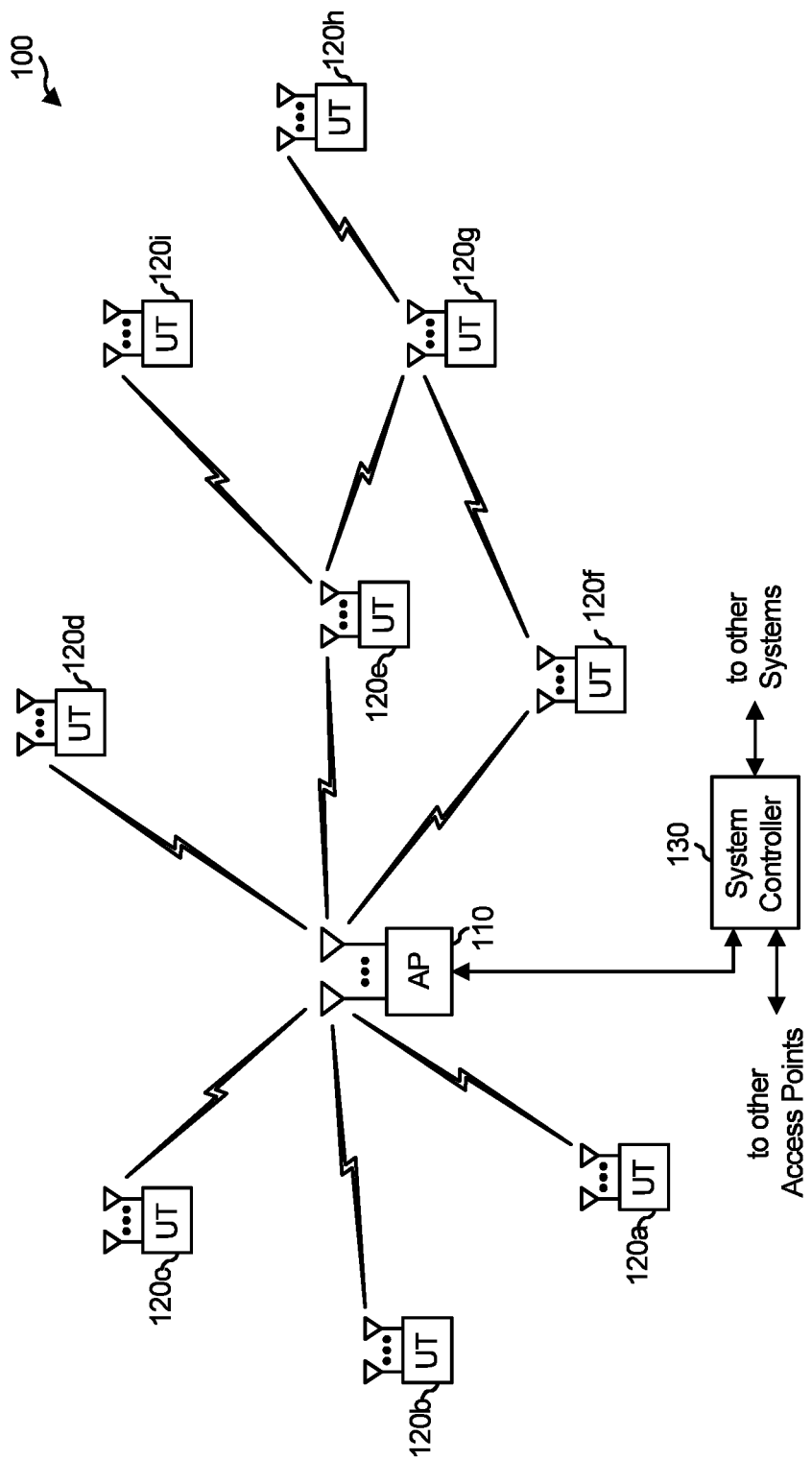
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows the term "receiving node" may be used to refer to a node that is receiving and the term "transmitting node" may be used to refer to a node that is transmitting. Such a reference does not imply that the node is incapable of performing both transmit and receive operations.

In an aspect of the present disclosure, the wireless network 100 may represent the IEEE 802.11 Wide Local Area Network (WLAN) utilizing the Very High Throughput (VHT) protocol for signal transmissions utilizing a carrier frequency of 5 GHz (i.e., the IEEE 802.11ac specification) or utilizing a carrier frequency of 60 GHz (i.e., the IEEE 802.11ad specification) targeting aggregate throughputs larger than 1 Gigabits per second. The VHT 5 GHz specification may utilize a wider channel bandwidth, which may comprise two 40 MHz channels for achieving 80 MHz bandwidth, therefore doubling the PHY data rate with negligible increase in cost compared to the IEEE 802.11n standard.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. In an aspect of the present disclosure, at the access point 110, a very high throughput long training field (VHT-LTF) sequence may be constructed within a VHT preamble transmitted to one or more of the access terminals 120 such that to achieve a preferred level of peak-to-average power ratio (PAPR) at a transmitter of the access point 110. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console or any other suitable wireless node.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support multiple-input multiple-output (MIMO) technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA) or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
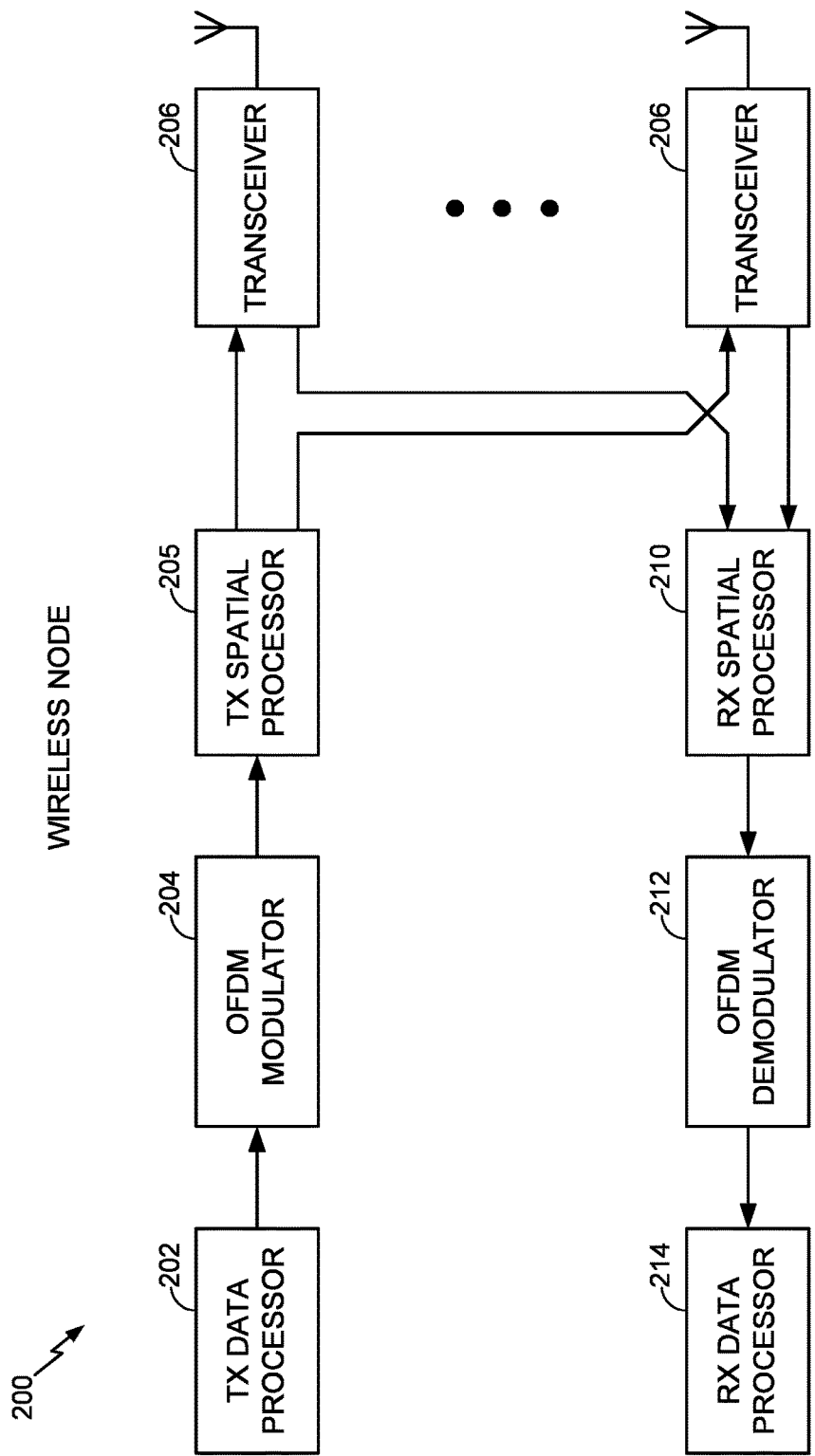
FIG. 2 illustrates an example block diagram of signal processing functions of a physical layer (PHY) of a wireless node in the wireless communications network of FIG. 1 in accordance with certain aspects of the present disclosure.

FIG. 2 illustrates a conceptual block diagram illustrating an example of the signal processing functions of the Physical (PHY) layer. In a transmit mode, a TX data processor 202 may be used to receive data from the Media Access Control (MAC) layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols. In an aspect of the present disclosure, the TX data processor 202 may generate a very high throughput long training field (VHT-LTF) sequence within a transmission VHT preamble such that to achieve a preferred level of PAPR.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 206 performs spatial processing on the OFDM stream. This may be accomplished by spatially precoding each OFDM and then providing each spatially precoded stream to a different antenna 208 via a transceiver 206. Each transmitter 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC) or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

Figure 3:
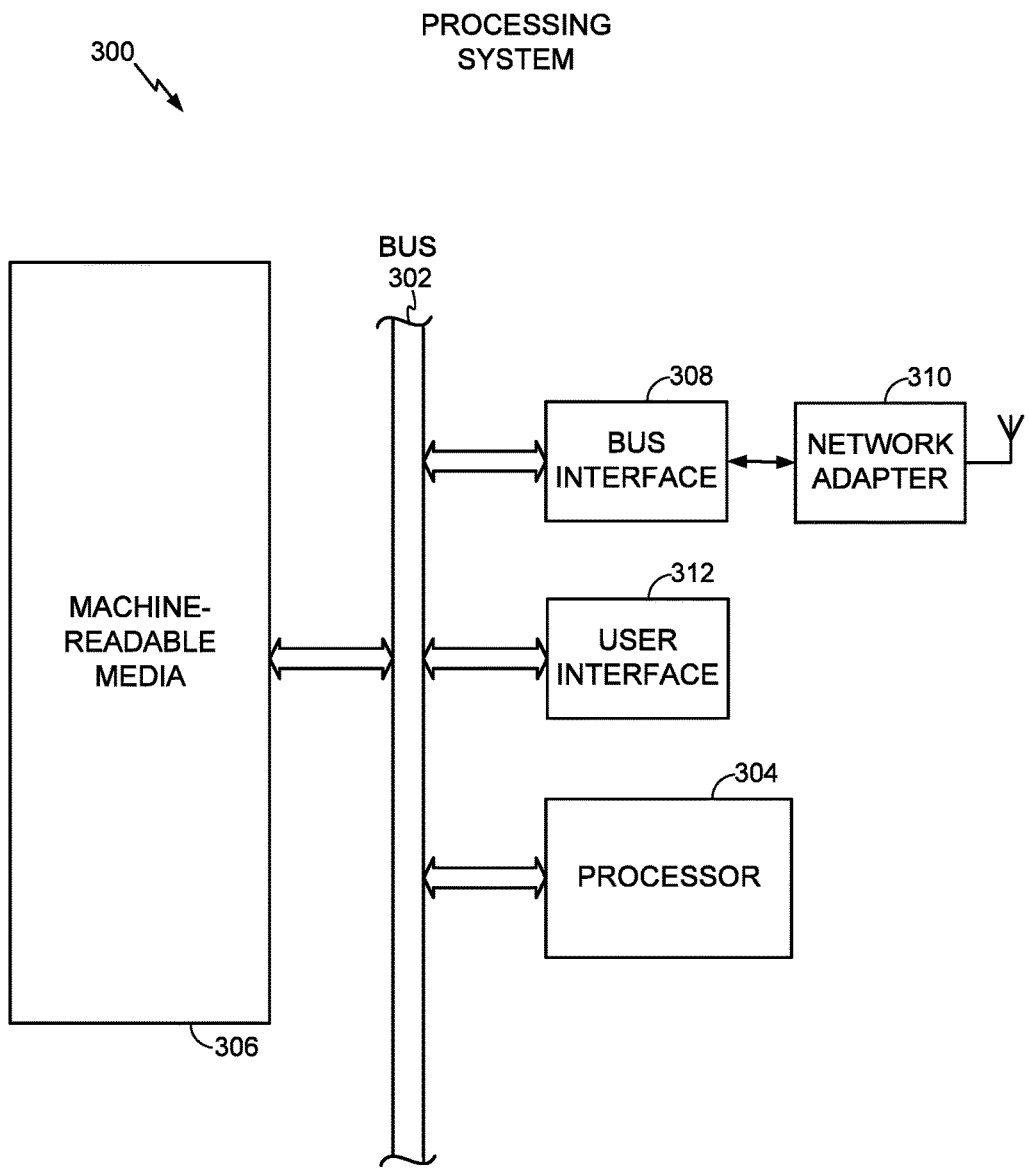
FIG. 3 illustrates a block diagram of an exemplary hardware configuration for a processing system in a wireless node in the wireless communications network of FIG. 1 in accordance with certain aspects of the present disclosure.

FIG. 3 illustrates a conceptual diagram illustrating an example of a hardware configuration for a processing system in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, machine-readable media 306 and a bus interface 308. The bus interface 308 may be used to connect a network adapter 310, among other things, to the processing system 300 via the bus 302. The network adapter 310 may be used to implement the signal processing functions of the PHY layer. In the case of an access terminal 110 (see FIG. 1), a user interface 312 (e.g., keypad, display, mouse, joystick, etc.) may also be connected to the bus. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the machine-readable media 306. The processor 304 may be implemented with one or more general-purpose and/or special-purpose processors. Examples include microprocessors, microcontrollers, DSP processors and other circuitry that can execute software. Software shall be construed broadly to mean instructions, data or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials. In an aspect of the present disclosure, the processor 304 may perform or direct operations 900 in FIG. 9 and/or other processes for the techniques described herein.

In the hardware implementation illustrated in FIG. 3, the machine-readable media 306 is shown as part of the processing system 300 separate from the processor 304. However, as those skilled in the art will readily appreciate, the machine-readable media 306, or any portion thereof, may be external to the processing system 300. By way of example, the machine-readable media 306 may include a transmission line, a carrier wave modulated by data, and/or a computer product separate from the wireless node, all which may be accessed by the processor 304 through the bus interface 308. Alternatively, or in addition to, the machine readable media 306, or any portion thereof, may be integrated into the processor 304, such as the case may be with cache and/or general register files.

The processing system 300 may be configured as a general-purpose processing system with one or more microprocessors providing the processor functionality and external memory providing at least a portion of the machine-readable media 306, all linked together with other supporting circuitry through an external bus architecture. Alternatively, the processing system 300 may be implemented with an ASIC (Application Specific Integrated Circuit) with the processor 304, the bus interface 308, the user interface 312 in the case of an access terminal), supporting circuitry (not shown), and at least a portion of the machine-readable media 306 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 300 depending on the particular application and the overall design constraints imposed on the overall system.

Certain aspects of the present disclosure support a method and apparatus for constructing a training sequence as a part of VHT transmission preamble such that a PAPR at a transmitting node can be sufficiently low. In an aspect, the training sequence may comprise a VHT-LTF sequence.

Figure 4:
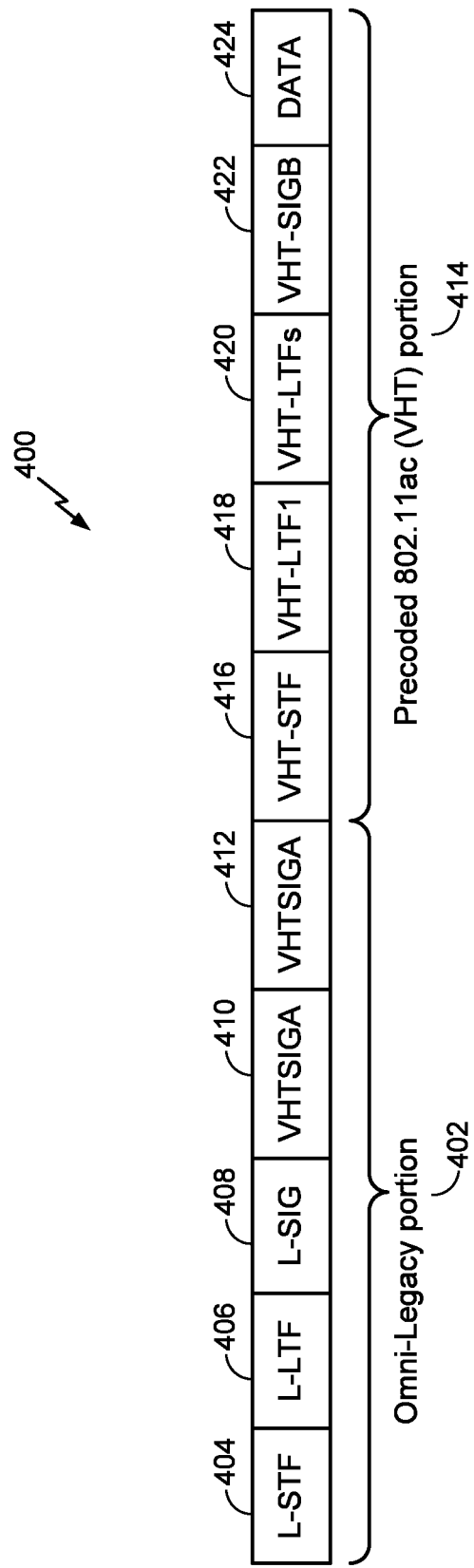
FIG. 4 illustrates an example structure of preamble comprising a very high throughput long training field (VHT-LTF) sequence in accordance with certain aspects of the present disclosure.

Methods of Constructing Long Training Field Sequence for 80 Mhz Channel Bandwidth FIG. 4 illustrates an example structure of a preamble 400 comprising a VHT-LTF sequence in accordance with certain aspects of the present disclosure. The preamble 400 may be transmitted from the access point 110 to one or more of the access terminals 120 in the wireless network 100 illustrated in FIG. 1. The preamble 400 may be transmitted in accordance with IEEE 802.11ac specification or in accordance with IEEE 802.11ad specification.

In an aspect of the present disclosure, the preamble 400 may comprise an omni-legacy portion 402 and a precoded 802.11ac VHT portion 414. The legacy portion 402 may comprise: a Legacy Short Training Field (L-STF) 404, a Legacy Long Training Field 406, a Legacy Signal (L-SIG) field 408, and two OFDM symbols 410, 412 for Very High Throughput Signal fields type A (VHT-SIG-A fields). The VHT-SIG-A fields 410, 412 may be transmitted omni-directionally. The precoded 802.11ac VHT portion 414 may comprise: a Very High Throughput Short Training Field (VHT-STF) 416, a Very High Throughput Long Training Field 1 (VHT-LTF1) 418, Very High Throughput Long Training Fields (VHT-LTFs) 420, a Very High Throughput Signal field type B (VHT-SIG-B field 422), and a data packet 424. The VHT-SIG-B field may comprise one OFDM symbol and may be transmitted precoded/beamformed.

Robust multi-user (MU) MIMO reception may require that the AP transmits all VHT-LTFs 420 to all supported users. The VHT-LTF sequence 420 may allow each user to estimate a MIMO channel from all AP antennas to the user antennas. The user may utilize the estimated channel to perform effective interference nulling from MU-MIMO streams corresponding to other users. In an aspect of the present disclosure, a novel structure of the VHT-LTF sequence 420 may be constructed in an effort to minimize (or at least reduce) PAPR at a transmitter of the AP.

In an aspect of the present disclosure, the VHT-LTF sequence may be constructed for 80 MHz channel by using four 802.11a LTF sequences in 20 MHz sub-bands covered by a complementary sequence, wherein the complementary sequence may be equivalent to phase rotation on each of the 20 MHz sub-bands. Also, some additional tone values may be chosen in an effort to minimize (or at least reduce) the PAPR during transmission of the VHT-LTF sequence. Hence, the VHT-LTF pattern may be defined as:

$$\text{VHTLTF}_{-122,122}=\{c1.*[1,1,-1,-1,1,1,-1,1,-1,1,1,1,1,1,\\ 1,1-1,-1,1,1,1,-1,1,1,1,1,1,\text{interp20Null}],$$

$$c1.*[1,-1,-1,1,1,-1,1,-1,-1,-1,-1,1,1,1,-1,1,1,-1,\\ 1,-1,1,1,1,1,1],$$

interp40Null, $$c2.*[1,1,-1,-1,1,1,-1,1,-1,1,1,1,1,1,1,-1,-1,1,1,1,-1,\\ 1,-1,1,1,1,1,1,\text{interp20Null}],$$

$$c2.*[1,-1,-1,1,1,-1,1,-1,1,-1,1,1,-1,-1,-1,-1,1,1,1,-\\ 1,-1,1,-1,1,1,1,1,1],$$

interp80ExtraL,0,0,0,interp80ExtraR, $$c3.*[1,1,-1,-1,1,1,-1,1,-1,-1,1,1,1,1,1,1,1,-1,-1,1,1,1,-\\ 1,-1,1,1,1,1,1,\text{interp20Null}],$$

$$c3.*[1,-1,-1,1,1,-1,1,-1,-1,-1,-1,-1,1,1,1,-1,-1,\\ 1,-1,1,-1,1,1,1,1,1],$$

interp40Null, $$c4.*[1,1,-1,-1,1,1,-1,1,-1,1,1,1,1,1,1,1,-1,-1,1,1,1,-1,-\\ 1,1,1,1,1,1,\text{interp20Null}],$$

$$c4.*[1,-1,-1,1,1,-1,1,-1,1,-1,-1,-1,-1,1,1,1,-1,-1,\\ 1,-1,1,-1,1,1,1,1,1]\}. \quad (1)$$

It can be observed from equation (1) that there may be at most three zero tone values (subcarriers) around the DC tone, the interpolating sequences interp20Null, interp40Null, interp80ExtraL, interp80ExtraR may comprise extra tones to be chosen in an effort to minimize (or at least reduce) the PAPR, and [c1 c2 c3 c4] may represent the complementary sequence.

By applying various phase rotation patterns on the 20 MHz sub-bands, different PAPR results may be obtained when transmitting VHT-LTF sequences designed based on the VHT-LTF pattern from equation (1). In general, the VHT-LTF sequences constructed based on four 20 MHz 802.11a LTF sequences may provide improved PAPR results compared to VHT-LTF sequences constructed based on two 802.11n LTF sequences in 40 MHz sub-bands.

It should be noted that phase rotation of upper 40 MHz band may not result into PAPR reduction; the PAPR results may be even worse. In an aspect, the complementary sequences [1 1 1 −1] and [1 −1 1 1] may provide better PAPR results than the complementary sequences [1 1 −1 1] and [−1 1 1 1]. Also, phase rotation by 90 degrees of an odd or even 20 MHz sub-band may not help in further PAPR reduction.

The VHT-LTF sequences constructed for 80 MHz channel bandwidth based on the pattern from equation (1) may provide preferred PAPR results for different non-oversampling and oversampling cases, if the VHT-LTFs comprise interpolating sequences interp20Null, interp40Null, interp80ExtraL, interp80ExtraR and the rotation pattern [c1 c2 c3 c4] as given in FIG. 5A. It should be noted that the label "with rotation" in FIG. 5A and in FIGS. 5B-5J that follows refers to the phase rotation of tones in upper 40 MHz band by 90 degrees, while the label "4×TDI" refers to four times oversampling based on time-domain interpolation (TDI). Sampling rates of 80 Mega-samples per second (Msps) or 320 Msps may be utilized, as illustrated in FIGS. 5A-5J.

In an aspect of the present disclosure, the VHT-LTF sequence may be constructed for transmission over 80 MHz channel by using all 20 MHz 802.11a tones and 40 MHz 802.11n tones. Thus, in any 20 MHz sub-band, every tone that may be present in 20 MHz 802.11a or in 40 MHz 802.11n may have the value of corresponding tone from the 20 MHz LTF sequence or the 40 MHz HT-LTF sequence. In addition, a complementary phase rotation sequence may be applied per 20 MHz 802.11a bandwidth (i.e., 802.11a tones may be rotated), and a few missing tones may be filled. In this case, the VHT-LTF pattern may be given as:

$$\text{VHTLTF}_{-122,122}=\{c1.*[1,1,-1,-1,1,1,-1,1,-1,1,1,1,1,\\ 1,1-1,-1,1,1,-1,1,1,1,1,1],$$

$$c1.*[1,-1,-1,1,1,-1,1,-1,1,-1,-1,-1,-1,1,1,1,-1,-1,\\ 1,-1,1,-1,1,1,1,1,1],$$

−1,−1,−1,1,interp40Null,−1,1,1,−1, $$c2.*[1,1,-1-,1,1,1,-1,1,1,1,1,1,1,1,1,-1,-1,1,-1,-1,\\ 1,1,1,1,1,1],$$

$$c2.*[1,-1,-1,1,1,-1,1,-1,-1,-1,-1,-1,1,1,1,-1,-1,\\ 1,-1,1,-1,1,1,1,1,1],$$

interp80ExtraL,0,0,0,interp80ExtraR, $$c3.*[1,1,-1,-1,1,1,-1,1,1,1,1,1,1,1,1,1,1,-1,-1,1,-1,-1,\\ 1,1,1,1,1,1],$$

c3.*[1,-1,-1,1,1,-1,1,-1,1,-1,-1,-1,-1,1,1,1,-1,-1, 1,-1,1,-,1,1,1,1,1],

-1,-1,-1,1,interp40Null,-1,1,1,-1, c4.*[1,1,-1,-1,1,1,-1,1,1,1,1,1,1,1,1,-1,-1,1,1,-1,-1, 1,1,1,1,1], c4.*[1,-1,-1,1,1,-1,1,-1,1,-1,-1,-1,-1,1,1,1,-1,1,1,-1, 1,-1,1,1,1,1]}.　　(2)

It can be observed from equation (2) that there may be three zero subcarriers around the DC tone, the interpolating sequences interp40Null, interp80ExtraL, interp80ExtraR may comprise extra tones to be chosen in an effort to minimize (or at least reduce) the PAPR, and [c1 c2 c3 c4] may represent the complementary phase rotation sequence. One advantage of the VHT-LTF pattern from equation (2) can be that there may be no need to store different values for existing 20 MHz 802.11a and 40 MHz 802.11n tones. On the other hand, a level of PAPR may be slightly higher than that of the VHT-LTF pattern from equation (1) because of less extra tones to be chosen in an effort to minimize (or at least reduce) the PAPR.

By applying various phase rotation patterns on 20 MHz sub-bands, different PAPR results may be obtained when transmitting 80 MHz VHT-LTF sequences designed based on the VHT-LTF pattern from equation (2). It can be observed that the VHT-LTF sequences based on the pattern from equation (2) may represent a subset of the previously generated VHT-LTF sequences based on the pattern from equation (1). Therefore, PAPR results of the VHT-LTF sequences constructed based on the pattern from equation (2) may not be better than PAPR results of the VHT-LTF sequences constructed based on the pattern from equation (1). The VHT-LTF sequences constructed for 80 MHz channel bandwidth based on the pattern from equation (2) may provide preferred PAPR results for different non-oversampling and oversampling cases, if the VHT-LTFs comprise the interpolating sequences interp40Null, interp80ExtraL, interp80ExtraR and the rotation pattern [c1 c2 c3 c4] as given in FIG. 5B.

In an aspect of the present disclosure, the VHT-LTF sequence may be constructed for transmission over 80 MHz channel by slightly modifying the VHT-LTF pattern defined by equation (2). All 20 MHz 802.11a tones and 40 MHz 802.11n tones may be utilized along with the complementary phase rotation sequence applied on each 20 MHz sub-band (i.e., 20 MHz 802.11a tones plus extra data tones of 40 MHz 802.11n). In addition, a few missing tones may be filled. In this case, the VHT-LTF pattern for 80 MHz channel may be given as:

$\text{VHTLTF}_{-122,122} = \{c1.*[1,1,-1,-1,1,1,-1,1,-1,1,1,1,1,1, 1,1,-1,-1,1,1,1,-1,1,-1,1,1,1,1,1,1],$ c1.*[1,-1,-1,1,1,-1,1,-1,1,-1,1,-1,-1,-1,-1,1,1,1,-1,-1, 1,-1,1,-1,1,1,1,1], c1.*[-1,-1,-1,1,interp40Null,c2.*[-1,1,1,-1], c2.*[1,1,-1,-,1,1,1,-1,1,-1,1,1,1,1,1,1,1,-1,-1,1,1,-1, 1,-1,1,1,1,1,1], c2.*[1,-1,-1,1,1,-1,1,-1,1,-1,-1,-1,-1,1,1,1,-1,-1, 1,-1,1,-,1,1,1,1,1], interp80ExtraL,0,0,0,interp80ExtraR, c3.*[1,1,-1,-1,1,1,1,1,-1,1,-1,1,1,1,1,1,1,1,-1,-1,1,1,1, c3.*[1,-1,-1,1,1,-1,1,-1,1,-1,-1,-1,-1,1,1,1,-1,-1, 1,-1,1,-,1,1,1,1,1], -1,-1,-1,1,interp40Null,-1,1,1,-1, c4.*[1,1,-1,-1,1,1,-1,1,-1,1,1,1,1,1,1,1,-1,-1,1,1,-1, 1,-1,1,1,1,1,1], c4.*[1,-1,-1,1,1,-1,1,-1,-1,-1,-1,-1,1,1,1,-1,1,1,-1,-1, 1,-1,1,-,1,1,1,1,1]}.　　(3)

It can be observed from equation (3) that there may be three zero subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary phase rotation sequence. The VHT-LTF sequences based on the pattern from equation (3) may be different in rotation tone coverage from the VHT-LTF sequences based on equations (1) and (2). One advantage of the VHT-LTF pattern defined by equation (3) can be that there may be no need to store different values for existing 20 MHz 802.11a and 40 MHz 802.11n tones. On the other hand, a level of PAPR may be slightly higher compared to that of the VHT-LTF pattern defined by equation (1) because of less extra tones to be optimized in an effort to minimize (or at least reduce) the PAPR.

The VHT-LTF sequences constructed for 80 MHz channel bandwidth based on the pattern from equation (3) may provide preferred PAPR results for different non-oversampling and oversampling cases, if the VHT-LTFs comprise the interpolating sequences interp40Null, interp80ExtraL, interp80ExtraR and the rotation pattern [c1 c2 c3 c4] as given in FIG. 5C. It can be observed from FIG. 5C that the best PAPR result of 3.2110 dB may be obtained, which is better than that of the VHT-LTF sequence based on the pattern from equation (1) (i.e., the PAPR of 3.2163 dB given in FIG. 5A) due to different rotation tone coverage.

In an aspect of the present disclosure, the VHT-LTF sequence may be constructed for transmission over 80 MHz channel by using all existing 20 MHz 802.11a, 20 MHz 802.11n and 40 MHz 802.11n tones with the complementary sequence phase rotation applied on each 20 MHz sub-band (i.e., 20 MHz 802.11a tones plus extra data tones of 40 MHz 802.11n) and filling in a few missing tones. In this case, the VHT-LTF pattern may be given as:

$\text{VHTLTF}_{-122,122} = \{c1.*[1,1,-1,-1,1,1,-1,1,-1,1,1,1,1,1, 1,1,-1,-1,1,1,1,-1,1,-1,1,1,1,1,1,1],$ c1.*[1,-1,-1,1,1,-1,1,-1,1,-1,1,-1,-1,-1,-1,1,1,1,-1,-1, 1,-1,1,-1,1,1,1,1], c1.*[-1,-1,-1,1],interp40Null,c2.*[-1,1,1,-1], c2.*[1,1,-1,-,1,1,1,-1,1,1,1,1,1,1,1,1,-1,-1,1,1,1,-1,-1,1,1,1, 1,1,1], c2.*[1,-1,-1,1,1,-1,1,-1,1,-1,-1,-1,1,1,1,1,-1,-1,1,1, 1,-1,1,-1,1,1,1,1], c2.*[-1,-1]interp80ExtraL,0,0,0,interp80ExtraR,c3.* [1,1], c3.*[1,1,-1,-1,1,1,-1,1,-1,1,-1,-1,-1,-1,1,1,1,-1,- 1,1,1,1,-1,1,1,1,1,1], c3.*[1,-1,-1,1,1,-1,1,-1,1,-1,-1,-1,-1,1,1,1,-1,-1, 1,-1,1,-1,1,1,1,1], c3.*[-1,-1,-1,1],interp40Null,c4.*[-1,1,1,-1], c4.*[1,1,−1,−1,1,−1,1,1,1,1,1,1,1,−1,−1,1,1,1,−1,1,−
1,1,1,1,1,1], c4.*[1,−1,−1,1,1,−1,1,−1,1,−1,1,−1,−1,−1,1,1,−1,−
1,1,1,−1,1,−1,1,1,1,1]}.     (4)

It can be observed from equation (4) that there may be three zero subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary sequence. The VHT-LTF pattern defined by equation (4) may differ from the VHT-LTF pattern defined by equation (3) in that four extra tones beside interp80ExtraL and interp80ExtraR may be filled by 20 MHz 802.11n LTF values. The VHT-LTF sequences constructed for 80 MHz channel bandwidth based on the pattern defined by equation (4) may provide preferred PAPR results for various non-oversampling and oversampling cases, if the constructed VHT-LTFs comprise the interpolating sequences interp40Null, interp80ExtraL, interp80ExtraR and the rotation pattern [c1 c2 c3 c4] as given in FIG. 5D.

In an aspect of the present disclosure, by modifying the VHT-LTF pattern defined by equation (4), the VHT-LTF sequence may be constructed for transmission over 80 MHz channel by using all existing 20 MHz 802.11a, 20 MHz 802.11n and 40 MHz 802.11n tones, and by utilizing identical interpolating sequences interp80ExtraL, interp80ExtraR. In this case, the VHT-LTF pattern may be given as:

VHTLTF$_{-122,122}$={c1.*[1,1,−1,−1,1,1,−1,1,−1,1,1,1,1,1,
1,1−1,−1,1,1,−1,1,−1,1,1,1,1,1,1], c1.*[1,−1,−1,1,1,−1,1,−1,1−1,−1,1,−1,−1,1,1,1−1,−1,
1,−1,1,−1,1,1,1,1,1], c1.*[−1,−1,−1,1],interp40Null,c2.*[−1,1,1,−1], c2.*[1,1,−1,1,1,1,−1,1,−1,1,1,1,1,1,1,1,−1,−1,1,1,−1,
1,−1,1,1,1,1,1], c2.*[1,−1,−1,1,1,−1,1,−1,1,−1,−1,−1,−1,1,1,−1,−1,
1,−1,1,−1,1,1,1,1], c2.*[−1,−1],interp80Extra,0,0,0,interp80ExtraR,c3.*
[1,1], c3.*[1,1,−1,−1,1,1,−1,1 1,1,1,1,1,1,1,−1,−1,1,1,1,−1,−
1,1,1,1,1,1], c3.*[1,−1,−1,1,1,−1,1,−1,1,−1,−1,−1,−1,1,1,−1,−1,
1,−1,1,−1,1,1,1,1,1], c3.*[−1,−1,−1,1],interp40Null,c4.*[−1,1,1,−1], c4.*[1,1,−1,−1,1,1,−1,1,−1,1,1,1,1,1,1,1,−1,−1,1,1,1,−,
1,−1,1,1,1,1,1,1,1], c4.*[1,−1,−1,1,1,−1,1,−1,1,−1,−1,−1,−1,1,1,1,−1,−1,
1,−1,1,−1,1,1,1,1,1,1]}.     (5)

It can be observed from equation (5) that there may be three zero subcarriers around the DC tone, interpolating sequences interp40Null, interp80Extra may comprise extra tones to be chosen in an effort to minimize (or at least reduce) the PAPR, and [c1 c2 c3 c4] may represent the complementary sequence. The VHT-LTF sequences constructed for 80 MHz channel bandwidth based on the pattern defined by equation (5) may provide preferred PAPR results for different non-oversampling and oversampling cases, if the VHT-LTF sequences comprise the interpolating sequences interp40Null, interp80Extra and the rotation pattern [c1 c2 c3 c4] as given in FIG. 5E.

Figure 6:
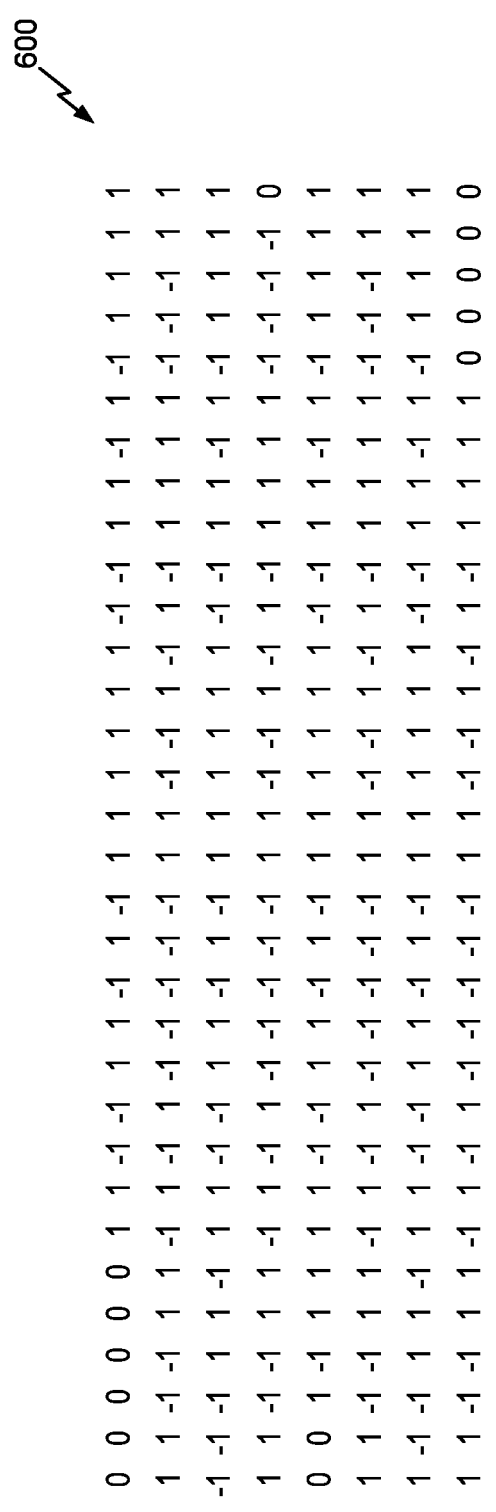

In an aspect of the present disclosure, for 242 subcarriers allocated for the VHT-LTF, VHT-LTF pattern starting at subcarrier number −128 of the 80 MHz band may comprise a bit sequence 600 illustrated in FIG. 6. The VHT-LTF pattern 600 may utilize at least one of existing 40 MHz 802.11n subcarrier values or 20 MHz 80211n subcarrier values (around DC only). This VHT-LTF sequence may require ten extra subcarriers, four around DC and six around 40 MHz 802.11n DC subcarriers. The interpolating sequences may be given as [Interp40NullL Interp80ExtraL Interp80ExtraR Interp40NullR]={1, −1, −1, −1, −1, 1, −1, 1, 1, −1}, wherein first three values may correspond to Interp40NullL, next two values may correspond to Interp80ExtraL, next two values may correspond to Interp80ExtraR, and last three values may correspond to Interp40NullR.

One difference between the VHT-LTF sequence 600 and the VHT-LTF patterns defined by equations (1)-(5) is that three Interp40Null tones may be different for the left and right part of the VHT-LTF sequence 600 (i.e., for upper and lower 40 MHz band). In an aspect, an extra phase rotation per 20 MHz sub-band may be applied on top of the binary values 600, wherein the phase rotation may correspond to any multiple of 90 degrees.

In an aspect of the present disclosure, the phase rotation pattern {1, 1, 1, −1} applied per 20 MHz sub-band may provide a preferred PAPR of 4.76 dB using cyclic interpolation and 4-times oversampling. In this case, signs of last 64 elements of the sequence 600 may be inverted. In another aspect, in order to preserve the 90 degrees phase shift between upper and lower 40 MHz sub-channel, a rotation pattern of {1, j, 1, j} may be used with preferred extra ten subcarrier values being {1, −1, 1, −1, −1, 1, −1, −1, −1, −1}.

In an aspect of the present disclosure, different null tone values may be used for different portions of bandwidth of 80 MHz (i.e., for the upper and lower 40 MHz sub-channels) in the VHT-LTF pattern defined by equation (3). In this case, the VHT-LTF pattern for transmission over 80 MHz channel may be given as:

VHTLTF$_{-122,122}$={c1.*[1,1,−1,−1,1,1,−1,1,−1,1,1,1,1,
1,1−1,−1,1,1,−1,1,−1,1,1,1,1,1], c1.*[1,−1,−1,1,1,−1,1,−1,1,1−1,−1,−1,−1,1,1,1−1,−1,
1,−1,1,−1,1,1,1,1,1], c1.*[−1,−1,−1,1],interp40NullL,c2.*[−1,1,1,−1], c2.*[1,1,−1,1,1,1,−1,1,−1,1,1,1,1,1,1,1,−1,−1,1,1,−1,
1,−1,1,1,1,1,1], c2.*[1,−1,−1,1,1,1,−1,1,−1,1,−1,−1,−1,−1,1,1,−1,−
1,1,−1,1,−1,1,1,1,1], interp80ExtraL,0,0,0,interp80ExtraR, c3.*[1,1,−1,−1,1,1,−1,1,−1,1,1,1,1,1,1,1,−1,1,1,−1,1,−1,−1,
1,1,1,1,1], c3.*[1,−1,−1,1,1,−1,1,−1,1,−1,−1,−1,−1,1,1,−1,−1,
1,−1,1,−1,1,1,1,1,1], c3.*[−1,−1,−1,1],interp40NullR,c4.*[−1,1,1,−1], c4.*[1,1,−1,−1,1,1,−1,1,−1,1,1,1,1,1,1,1,−1,−1,1,1,−1,−1,
1,−1,1,1,1,1,1,1,1], c4.*[1,−1,−1,1,1,−1,1,−1,1,−1,−1,−1,−1,1,1,−1,−1,1,−1,−1,
1,−1,1,−1,1,1,1,1,1,1]}.     (6)

It can be observed from equation (6) that there may be three zero subcarriers around the DC tone, interpolating sequences interp40Null, interp40NullR, interp80ExtraL, interp80ExtraR may comprise extra tones to be chosen in an effort to minimize (or at least reduce) the PAPR, and [c1 c2 c3 c4] may represent the complementary sequence. The VHT-LTF sequences constructed for 80 MHz channel bandwidth based on the pattern from equation (6) may provide preferred PAPR results for different non-oversampling and oversampling cases, if the VHT-LTF sequences comprise the interpolating sequences interp40Null, interp40NullR, interp80ExtraL, interp80ExtraR and the phase rotation pattern [c1 c2 c3 c4] as given in FIG. 5F.

In an aspect of the present disclosure, different null tone values for the upper and lower 40 MHz sub-channels may be used in the VHT-LTF pattern defined by equation (3). In this case, the VHT-LTF sequence for transmission over 80 MHz channel may be given as:

$$VHTLTF_{-122,122} = \{c1.*[1,1,-1,-1,1,1,-1,1,-1,1,1,1,1,\\1,1\ 1,-1,1,1,-1,1,-1,1,1,1,1,1],$$

$c1.*[1,-1,-1,1,1,-1,1,-1,1-1,-1,-1,-1,-1,1,1-1,-1,$
    $1,-1,1,-1,1,1,1,1],$ $c1.*[-1,-1,-1,1],\text{interp40NullL},c2.*[-1,1,1,-1],$ $c2.*[1,1,-1,-1,1,1,-1,1,1,1,1,1,1,1,-1,-1,1,1,-1,-1,$
    $1,1,1,1,1,1],$ $c2.*[1,-1,-1,1,1,-1,1,-1,1,-1,-1,-1,-1,-1,1,1,-1,-1,$
    $1,-1,1,-1,1,1,1,1],$ interp80ExtraL,0,0,0,interp80ExtraR, $c3.*[1,1,-1,-1,1,1,-1,-1,1,1,1,1,1,1,1,-1,-1,1,1,-1,1,-$
    $1,1,1,1,1,1],$ $c3.*[1,-1,1,1,1,-1,1,-1,1,-1,-1,-1,-1,1,1,1,1,-1,-1,$
    $1,-1,1,-1,1,1,1,1],$ $c3.*[-1,-1,-1,1],\text{interp40NullR},c4.*[-1,1,1,-1],$ $c4.*[1,1,-1,-1,1,1,-1,1,-1,1,1,1,1,1,1,-1,-1,1,1,-1,$
    $1,-1,1,1,1,1,1],$ $c4.*[1,-1,-1,1,1,-1,1,-1,-1,-1,-1,1,1,1,-1,1,1,-1,1,-1,$
    $1,1,1,1]\}.$ (7)

It can be observed from equation (7) that there may be three zero subcarriers around the DC tone, interpolating sequences interp40Null, interp40NullR, interp80ExtraL, interp80ExtraR may comprise extra tones to be chosen in an effort to minimize (or at least reduce) the PAPR, and [c1 c2 c3 c4] may represent the complementary sequence. The VHT-LTF pattern from equation (7) may be defined in the same way as the VHT-LTF pattern from equation (6), but a different method to generate oversampled sequences with inverse fast Fourier transform (IFFT) of size 1024 may be utilized. The VHT-LTF sequences constructed for 80 MHz channel bandwidth based on the pattern from equation (7) may provide preferred PAPR results for different non-oversampling and oversampling cases, if the VHT-LTF sequences comprise the interpolating sequences interp40Null, interp40NullR, interp80ExtraL, interp80ExtraR and the phase rotation pattern [c1 c2 c3 c4] as given in FIG. 5G.

In an aspect of the present disclosure, by modifying the VHT-LTF pattern defined by equation (2), the VHT-LTF sequence may be also constructed for 80 MHz channel by using all 20 MHz 802.11a tones and 40 MHz 802.11n tones with the complementary sequence phase rotation applied on each 20 MHz sub-band (20 MHz 802.11a plus extra data tones of 40 MHz 802.11n) and filling in a few missing tones. In this case, the VHT-LTF pattern for transmission over 80 MHz channel may be defined as:

$$VHTLTF_{-122,122} = \{c1.*[1,1,-1,-1,1,1,-1,1,-1,1,1,1,1,\\1,1-1,-1,1,1,-1,1,-1,1,1,1,1,1],$$

$c1.*[1,-1,-1,1,1,-1,1,-1,1-1,-1,-1,-1,-1,1,1,1-1,-1,$
    $1,-1,1,-1,1,1,1,1],$ $c1.*[-1,-1,-1,1],\text{interp40Null},c2.*[-1,1,1,-1],$ $c2.*[1,1,-1,-1,1,1,-1,1,-1,1,1,1,1,1,1,1,-1,-1,1,1,-1,$
    $1,-1,1,1,1,1,1],$ $c2.*[1,-1,-1,1,1,-1,1,-1,-1,-1,-1,-1,-1,1,1,1,-1,-1,$
    $1,-1,1,-1,1,1,1,1],$ interp80ExtraL,0,0,0,interp80ExtraR, $c3.*[1,1,-1,-1,1,1,-1,1,-1,1,1,1,1,1,1,1,-1,-1,1,1,-1,$
    $1,-1,1,1,1,1,1],$ $c3.*[1,-1,-1,1,1,-1,1,-1,-1,-1,-1,-1,-1,1,1,1,-1,-1,$
    $1,-1,1,-1,1,1,1,1],$ $c3.*[-1,-1,-1,1],\text{interp40Null},c4.*[-1,1,1,-1],$ $c4.*[1,1,-1,-1,1,1,-1,1,-1,1,1,1,1,1,1,1,-1,-1,1,1,-1,1,-$
    $1,1,1,1,1,1],$ $c4.*[1,-1,-1,1,-1,1,1,-1,-1,-1,1,1,1,-1,-1,1,1,-$
    $1,1,1,1,1]\}.$ (8)

It can be observed from equation (8) that there may be three zero subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary sequence. The VHT-LTF pattern from equation (8) may be defined in the same way as the VHT-LTF pattern from equation (3), but a different method to generate oversampled sequences with IFFT of size 1024 may be utilized. The VHT-LTF sequences constructed for 80 MHz channel bandwidth based on the pattern from equation (8) may provide preferred PAPR results for different non-oversampling and oversampling cases, if the VHT-LTF sequences comprise the interpolating sequences interp40Null, interp80ExtraL, interp80ExtraR and the phase rotation pattern [c1 c2 c3 c4] as given in FIG. 5H.

In an aspect of the present disclosure, by modifying the VHT-LTF pattern defined by equation (8), the VHT-LTF sequence for transmission over 80 MHz channel may be also constructed by using all 40 MHz 802.11n tones with the complementary sequence phase rotation applied on each 20 MHz sub-band and filling in a few missing tones. In this case, the VHT-LTF pattern for transmission over 80 MHz channel may be given as:

$$VHTLTF_{-122,122} = \{c1.*[1,1,-1,-1,1,1,-1,1,-1,1,1,1,1,\\1,1-1,-1,1,1,-1,1,-1,1,1,1,1,1],$$

$c1.*[1,-1,-1,1,1,-1,1,-1,1-1,-1,-1,-1,-1,1,1,1-1,-1,$
    $1,-1,1,-1,1,1,1,1],$ $c1.*[[-1,-1,-1,1],\text{interp40Null}(1)],c2.*[\text{interp40Null}$
    $(2,3),[-1,1,1,-1]],$ $c2.*[1,1,-1,-1,1,1,-1,1,-1,1,1,1,1,1,1,1,-1,-1,1,1,-1,$
    $1,-1,1,1,1,1,1],$ $c2.*[1,-1,-1,1,1,-1,1,-1,1,-1,-1,-1,-1,1,1,-1,-1,$
   $1,-1,1,-1,1,1,1,1],$ $c2.*\text{interp80ExtraL},0,0,0,c3.*\text{interp80ExtraR},$ $c3.*[1,1,-1,-1,1,1,-1,1,-1,1,1,1,1,1,1,-1,-1,1,1,-1,$
   $1,-1,1,1,1,1,1],$ $c3.*[1,-1,-1,1,1,-1,1,-1,1,-1,-1,-1,-1,1,1,-1,-1,$
   $1,-1,1,-1,1,1,1,1],$ $c3.*[[-1,-1,-1,1],\text{interp40Null}(1)],c4.*[\text{interp40Null}$
   $(2,3),[-1,1,1,-1]],$ $c4.*[1,1,-1,-1,1,1,-1,1,-1,1,1,1,1,1,1,-1,-1,1,1,-1,$
   $1,-1,1,1,1,1,1],$ $c4.*[1,-1,-1,1,1,-1,1,-1,1,-1,-1,-1,-1,1,1,-1,-1,$
   $1,-1,1,-1,1,1,1,1]\}.$   (9)

It can be observed from equation (9) that there may be three zero subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary sequence. The VHT-LTF sequences constructed for 80 MHz channel bandwidth based on the pattern from equation (9) may provide preferred PAPR results for different non-oversampling and oversampling cases, if the VHT-LTF sequences comprise the interpolating sequences interp40Null, interp80ExtraL, interp80ExtraR and the phase rotation pattern [c1 c2 c3 c4] as given in FIG. 5I.

In an aspect of the present disclosure, different null tone values may be used for upper and lower 40 MHz sub-bands in the VHT-LTF pattern defined by equation (9). In this case, the VHT-LTF pattern for transmission over 80 MHz channel may be given as:

$\text{VHTLTF}_{-122,122}=\{c1.*[1,1,-1,1,1,1,-1,1,1,1,1,1,1,$
   $1,1,1,-1,-1,1,1,-1,-1,1,1,1,1,1],$ $c1.*[1,-1,-1,1,1,1,-1,1,-1,1,-1,-1,-1,-1,1,1,-1,-1,$
   $1,-1,1,-1,1,1,1,1],$ $c1.*[[-1,-1,-\mathbf{1},\mathbf{1}],\text{interp40NullL}(1)],c2.*$
   $[\text{interp40NullL}(2,3),[-1,1,1,-1]],$ $c2.*[1,1,-1-,1,1,1,-1,1,-1,1,1,1,1,1,1,-1,-1,1,1,-1,$
   $1,-1,1,1,1,1,1],$ $c2.*[1,-1,-1,1,1,-1,1,-1,1,-1,-1,-1,-1,1,1,-1,-1,$
   $1,-1,1,-1,1,1,1,1],$ $c2.*\text{interp80ExtraL},0,0,0,c3.*\text{interp80ExtraR},$ $c3.*[1,-1,-1,1,1,-1,1,-1,1,-1,-1,1,1,1,1,-\mathbf{1},-1,1,-1,$
   $1,-1,1,1,1,1,1],$ $c3.*[[-1,-1,-1,1],\text{interp40NullR}(1)],c4.*$
   $[\text{interp40NullR}(2,3),[-1,1,1,-1]],$ $c4.*[1,1,-1,-1,1,1,-1,1,-1,1,1,1,1,1,1,-1,-1,1,1,-1,$
   $1,-1,1,1,1,1,1],$ $c4.*[1,-1,-1,1,1,-1,1,-1,1,-1,-1,-1,-1,1,1,-1,-1,$
   $1,-1,1,-1,1,1,1,1]\}.$   (10)

It can be observed from equation (10) that there may be three zero subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary sequence. The VHT-LTF sequences constructed for 80 MHz channel bandwidth based on the pattern from equation (10) may provide preferred PAPR results for different non-oversampling and oversampling cases, if the VHT-LTF sequences comprise the interpolating sequences interp40Null, interp80ExtraL, interp80ExtraR and the phase rotation pattern [c1 c2 c3 c4] as given in FIG. 5J.

In an aspect of the present disclosure, the VHT-LTF tone values of the VHT-LTF pattern defined by equation (10) may be replaced at pilot tones with single stream pilot values 700 illustrated in FIG. 7A. In addition, one or more of P values illustrated in FIG. 7B may be applied on non-pilot tones of the VHT-LTF pattern to provide orthogonality between different streams of a transmitting node. PAPR results for different P values are also given in FIG. 7B, while 4-times oversampling with IFFT of size 1024 may be applied at the transmitting node. In this case, there may be at most 0.7 dB PAPR fluctuations from one VHT-LTF symbol to another VHT-LTF symbol and from one transmission stream to another.

In an aspect of the present disclosure, the VHT-LTF sequence may be constructed for transmission over 80 MHz channel by using all 20 MHz 802.11a tones and 40 MHz 802.11n tones, and utilizing different null tone values for upper and lower 40 MHz sub-bands. In addition, VHT-LTF tone values at pilot tones may be replaced with the single stream pilots 700 from FIG. 7A, the P value of "1" may be applied to non-pilot tones, with filling of missing tones and applying a phase rotation on each 20 MHz sub-channel. In this case, the VHT-LTF pattern for transmission over 80 MHz channel may be given as:

$\text{VHTLTF}_{-122,122}=\{c1.*[1,1,-1,-1,1,1,-1,1,-1,1,1,1,1,$
   $1,1,-1,-1,1,1,-1,-1,1,-1,1,1,1,1,1],$ $c1.*[1,-1,1,1,1,1,-1,1,1,-1,-1,-1,-1,-1,1,1,1,-1,-1,1,-$
   $1,[1],-1,1,1,1,1],$ $c1.*[[-1,-1,-1,1],\text{interp40NullL}(1)],c2.*$
   $[\text{interp40NullL}(2,3),[-1,1,1,-1]],$ $c2.*[1,1,-1-,1,1,-1,1,-1,1,1,1,1,1,1,1,-1,-1,1,1,[1],1,-$
   $1,1,1,1,1,1],$ $c2.*[1,-1,-1,1,1,-1,1,-1,1,-1,-1,-1,-1,1,1,-1,-1,$
   $1,-1,[1],-1,1,1,1,1],$ $c2.*\text{interp80ExtraL},0,0,0,c3.*\text{interp80ExtraR},$ $c3.*[1,1,-1,-1,1,[-1],-1,1,-1,1,1,1,1,1,1,-1,-1,1,1,-$
   $1,1,-1,1,1,1,1,1],$ $c3.*[1,-1,-1,1,1,-1,[-1],-1,1,-1,-1,-1,-1,-1,1,1,-$
   $1,-1,1,-1,-1,1,1,1,1,1],$ $c3.*[[-1,-1,-1,1],\text{interp40NullR}(1)],c4.*$
   $[\text{interp40NullR}(2,3),[-1,1,1,-1]],$ $c4.*[1,1,-1,-1,1,[1],-1,1,-1,1,1,1,1,1,1,1,-1,-1,1,1,-1,$
   $1,-1,1,1,1,1,1],$ $c4.*[1,-1,-1,1,1,-1,[1],-1,1,-1,-1,-1,-1,-1,1,1,-1,-$
   $1,1,-1,1,-1,1,1,1,1,1]\}.$   (11)

A preferred 80 MHz VHT-LTF sequence with the single stream pilots 700 from FIG. 7A and the P value of "1" may achieve a PAPR of 4.6138 dB (4-times oversampling with IFFT of size 1024) by using phase rotation [c1 c2 c3 c4]=[−1 1 1 1] and interpolation sequences [interp80NullL, interp80ExtraL, interp80ExtraR, interp40NullR]=[1 −1 1, 1 −1 1 1, −1 −1 −1 1, 1 −1 1]. The PAPR results are illustrated in FIG. 7C for different P values.

In an aspect of the present disclosure, the VHT-LTF sequence may be constructed for transmission over 80 MHz channel by using all 20 MHz 802.11a tones and 40 MHz 802.11n tones, and utilizing different null tone values for upper and lower 40 MHz sub-bands. In addition, the VHT-LTF tone values at pilot tones may be replaced with the single stream pilots 700 from FIG. 7A, the P value of "−1" may be applied to non-pilot tones, with filling of missing tones and applying a phase rotation on each 20 MHz sub-channel. In this case, the VHT-LTF pattern used for constructing the VHT-LTF sequences may be defined as in equation (11).

A preferred 80 MHz VHT-LTF sequence with the single stream pilots 700 from FIG. 7A and the P value of "−1" may achieve a PAPR of 4.6073 dB (4-times oversampling with IFFT of size 1024) by using phase rotation [c1 c2 c3 c4]=[1 1 −1 1] and interpolation sequences [interp40NullL, interp80ExtraL, interp80ExtraR, interp40NullR]=[1 −1 1, 1 1 −1 1, 1 −1 1 1, −1 1 1]. The PAPR results are illustrated in FIG. 7D for different P values.

In an aspect of the present disclosure, the VHT-LTF sequence may be constructed for transmission over 80 MHz channel by using all 20 MHz 802.11a tones and 40 MHz 802.11n tones, and utilizing different null tone values for upper and lower 40 MHz sub-bands. In addition, the VHT-LTF tone values at pilot tones may be replaced with the single stream pilots 700 from FIG. 7A, the P value of exp(−jπ/3) may be applied to non-pilot tones, with filling of missing tones and applying a phase rotation on each 20 MHz sub-channel. In this case, a base pattern used for constructing the VHT-LTF sequences may be defined as in equation (11).

A preferred 80 MHz LTF sequence with the single stream pilots 700 from FIG. 7A and the P value of exp(−jπ/3) may achieve a PAPR of 4.8658 dB (4-times oversampling with IFFT of size 1024) by using phase rotation [c1 c2 c3 c4]=[−1 1 1 1] and interpolation sequences [interp40NullL, interp80ExtraL, interp80ExtraR, interp40NullR]=[1 −1 1, 1 −1 −1 1, 1 −1 1 1, 1 −1 1]. The PAPR results are illustrated in FIG. 7E for different P values.

In an aspect of the present disclosure, the VHT-LTF sequence may be constructed for transmission over 80 MHz channel by using all 20 MHz 802.11a tones and 40 MHz 802.11n tones, and utilizing different null tone values for the upper and lower 40 MHz sub-bands. In addition, the VHT-LTF tone values at pilot tones may be replaced with the single stream pilots 700 from FIG. 7A, the P value of exp(−j2π/3) may be applied to non-pilot tones, with filling of missing tones and applying a phase rotation on each 20 MHz sub-channel. In this case, a base pattern used for constructing the VHT-LTF sequences may be defined as in equation (11).

A preferred 80 MHz VHT-LTF sequence with the single stream pilots 700 from FIG. 7A and the P value of exp(−j2π/3) may achieve a PAPR of 4.8248 dB (4-times oversampling with IFFT of size 1024) by using phase rotation [c1 c2 c3 c4]=[1 1 −1 1] and interpolation sequences [interp40NullL, interp80ExtraL, interp80ExtraR, interp40NullR]=[1 −1 1, 1 1 −1 1, 1 −1 1 1, −1 1 1]. The PAPR results are illustrated in FIG. 7F for different P values.

In an aspect of the present disclosure, the VHT-LTF sequence may be constructed for transmission over 80 MHz channel by using all 20 MHz 802.11a tones and 40 MHz 802.11n tones, and utilizing different null tone values for upper and lower 40 MHz sub-bands. In addition, the VHT-LTF tone values at pilot tones may be replaced with the single stream pilots 700 from FIG. 7A, the P value of exp(−j4π/3) may be applied to non-pilot tones, with filling of missing tones and applying a phase rotation on each 20 MHz sub-channel. In this case, a base pattern used for constructing the VHT-LTF sequences may be defined as in equation (11).

A preferred 80 MHz VHT-LTF sequence with the single stream pilots 700 from FIG. 7A and the P value of exp(−j4π/3) may achieve a PAPR of 4.8248 dB (4-times oversampling with IFFT of size 1024) by using phase rotation [c1 c2 c3 c4]=[1 1 −1 1] and interpolation sequences [interp40NullL, interp80ExtraL, interp80ExtraR, interp40NullR]=[1 −1 1, 1 1 −1 1, 1 −1 1 1, −1 1 1]. The PAPR results are illustrated in FIG. 7G for different P values.

In an aspect of the present disclosure, the VHT-LTF sequence may be constructed for transmission over 80 MHz channel by using all 20 MHz 802.11a tones and 40 MHz 802.11n tones, and utilizing different null tone values for the upper and lower 40 MHz sub-bands. In addition, the VHT-LTF tone values at pilot tones may be replaced with the single stream pilots 700 from FIG. 7A, the P value of exp(−j5π/3) may be applied to non-pilot tones, with filling of missing tones and applying a phase rotation on each 20 MHz sub-channel. In this case, a base pattern used for constructing the VHT-LTF sequences may be defined as in equation (11).

A preferred 80 MHz VHT-LTF sequence with the single stream pilots 700 from FIG. 7A and the P value of exp(−j5π/3) may achieve a PAPR of 4.8658 dB (4-times oversampling with IFFT of size 1024) by using phase rotation [c1 c2 c3 c4]=[−1 1 1 1] and interpolation sequences [interp40NullL, interp80ExtraL, interp80ExtraR, interp40NullR]=[1 −1 1, 1 −1 −1 1, 1 −1 1 1, 1 −1 1]. The PAPR results are illustrated in FIG. 7H for different P values.

In an aspect of the present disclosure, the VHT-LTF sequence may be constructed for transmission over 80 MHz channel by using all 40 MHz 802.11n tones on both 40 MHz sub-channels, wherein the VHT-LTF tone values at pilot tones may be replaced with the single stream pilots 700 from FIG. 7A, with filling of missing tones and applying a phase rotation on each 20 MHz sub-channel, in an effort to minimize a largest PAPR (i.e., worse case PAPR result) over various P values applied on non-pilot tones, i.e.:

$$VHTLTF = \min_{S}\left\{\max_{P}[PAPR(S_k, P(i, j))]\right\}, \qquad (12)$$

where S represents all possible VHT-LTF sequences derived from the pattern defined by equation (11). The VHT-LTF sequences for transmission over 80 MHz channel may be constructed based on the pattern defined in equation (11).

A preferred 80 MHz VHT-LTF sequence may achieve a minimal worse case (maximal) PAPR of 5.0722 dB (4-times oversampling with IFFT of size 1024) over various P values by using phase rotation pattern [c1 c2 c3 c4]=[−1 1 1 1] and interpolation sequences [interp40NullL, interp80ExtraL, interp80ExtraR, interp40NullR]=[−1 1 1, −1 −1 1 −1, 1 −1 −1 1, 1 −1 1]. The PAPR results are illustrated in FIG. 7I for different P values.

In an aspect of the present disclosure, the stream of values 700 may not be applied on pilot tones, while different P values may be applied to all tones of the VHT-LTF pattern defined by equation (11). In this case, PAPR results may be the same as that of the base VHT-LTF sequence without applying P values.

In an aspect of the present disclosure, non-pilot tones of the VHT-LTF sequence may be multiplied with one or more P values (i.e., one or more elements of a P matrix), and pilot tones of the VHT-LTF sequence may be multiplied with one or more R values (i.e., one or more elements of a R matrix). Any applied P value unequal to applied R value may change the base VHT-LTF sequence. Therefore, different P and R values may lead to different PAPR results. Optimization of the VHT-LTF sequence may be performed by finding a sequence that minimizes a maximal PAPR over all possible P and R values, i.e.:

$$VHTLTF = \min_{S}\left\{\max_{P,R}[PAPR(S, P, R)]\right\}, \quad (13)$$

where S may represent sequences for all possible extra tone values and phase rotations per 20 MHz sub-bands. In an aspect, the level of PAPR may only depend on a product of P and R values. For example, $\{P, R\}=\{\exp(j\varphi),1\}$ and $\{P, R\}=\{-\exp(j\varphi),-1\}$ may provide the same VHT-LTF sequence rotated by 180 degrees.

In an aspect, optimization of the VHT-LTF sequence may be performed without utilizing the single stream values 700 on pilot tones. The VHT-LTF sequence may be constructed for transmission over 80 MHz channel by utilizing all 40 MHz 802.11n tones on both 40 MHz sub-channels with filling of missing tones and applying a phase rotation on each 20 MHz sub-channel. In this case, the constructed VHT-LTF pattern may be defined as:

$VHTLTF_{-122,122}=\{c1.*[1,1,-1,-1,1,1,1,1,1,1,1,1,1,$
$\quad 1-1,-1,1,1,-1,1,-1,1,1,1,1,1],$ $c1.*[1,-1,-1,1,1,-1,1,-1,1,-1,-1,-1,-1,1,1,1-1,-1,$
$\quad 1,-1,1,-1,1,1,1,1,1],$ $c1.*[[-1,1,-1,-1,1],\text{interp40NullL}(1)],c2.*$
$\quad [\text{interp40NullL}(2,3),[-1,1,1,-1]],$ $c2.*[1,1,-1,1,1,-1,1,-1,1,1,1,1,-1,-1,1,1,1,-1,1,-1,1,1,$
$\quad 1,1,1],$ $c2.*[1,-1,-1,1,1,-1,1,-1,1,-1,-1,-1,-1,1,1,-1,1,1,-1,$
$\quad 1,-1,1,1,1,1,1],$ $c2.*\text{interp80ExtraL},0,0,0,c3.*\text{interp80ExtraR},$ $c3.*[1,1,-1,-1,1,1,-1,1,-1,1,1,1,1,1,1,1,-1,-1,1,1,1,-1,$
$\quad 1,-1,1,1,1,1,1],$ $c3.*[1,-1,-1,1,1,-1,1,-1,1,-1,-1,-1,-1,1,1,1,-1,-1,$
$\quad 1,-1,1,-1,1,1,1,1,1],$ $c3.*[[-1,-1,-1,1],\text{interp40NullR}(1)],c4.*$
$\quad [\text{interp40NullR}(2,3),[-1,1,1,-1]],$ $c4.*[1,1,-1,-1,1,1,-1,1,-1,1,1,1,1,1,1,1,-1,-1,1,1,1,-1,$
$\quad 1,-1,1,1,1,1,1],$ $c4.*[1,-1,-1,1,1,-1,1,-1,1,-1,-1,-1,-1,1,1,1,-1,-1,$
$\quad 1,-1,1,-1,1,1,1,1,1]\}, \quad (14)$ where interp40NullL (3 tones), interp80ExtraL (4 tones), interp80ExtraR (4 tones), interp40NullR (3 tones) are extra tones, while interp40NullL and interp40NullR may not need to be identical; [c1 c2 c3 c4] is the phase rotation pattern comprising $\{+/-1,+/-j\}$ values. Missing tone values and the rotation pattern may be optimized for best PAPR.

Figures 8A, 8B, 8C:
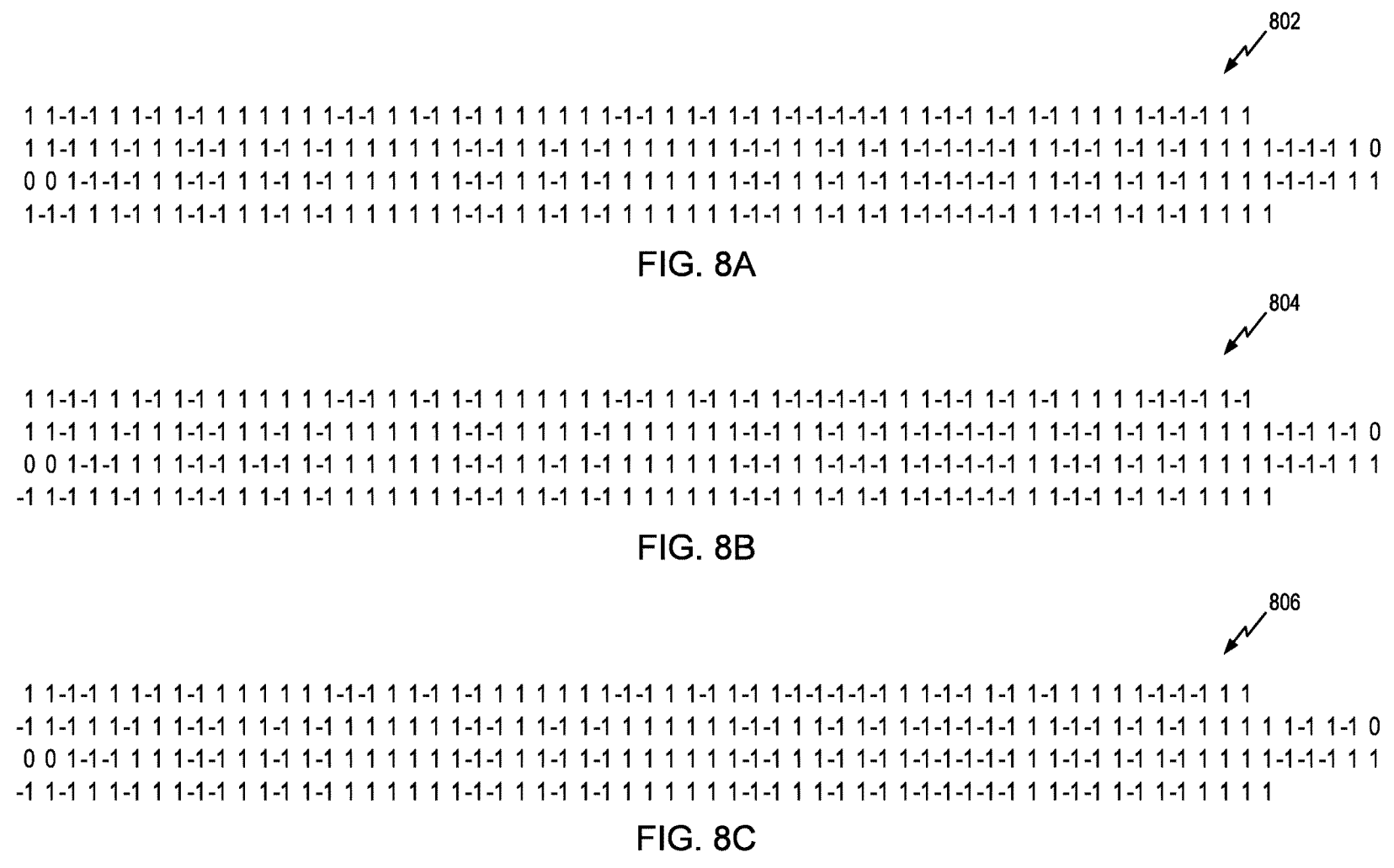

A preferred VHT-LTF sequence constructed for transmission over 80 MHz channel based on the pattern defined by equation (14) may achieve a PAPR of 4.48 dB (4-times oversampling with IFFT of size 1024) by using the phase rotation pattern [c1 c2 c3 c4]=[1 1 −1 1], or alternatively [−1 −1 1 −1], [j j −j j], [−j j j −j], while the interpolating sequences may be [interp40NullL, interp80ExtraL, interp80ExtraR, interp40NullR]=[1 1 1, −1 −1 −1 1, 1 −1 −1 −1, 1 1 −1]. The entire VHT-LTF pattern (excluding phase rotation per 20 MHz sub-channel) is illustrated in FIG. 8A, where each row of the bit pattern 802 may correspond to one of the four 20 MHz sub-channels. The proposed 80 MHz VHT-LTF pattern 802 may be 0.24 dB better in PAPR than the optimal pattern from the constraint search space assuming equal null tone values for the upper and lower 40 MHz sub-bands.

In another aspect of the present disclosure, optimization of the VHT-LTF sequence may be performed by applying the single stream values 700 on pilot tones. The VHT-LTF sequence may be constructed for 80 MHz channel by utilizing all 40 MHz 802.11n tones on both 40 MHz sub-channels, replacing the tone values at pilot tones with the single stream pilots 700 from FIG. 7A, with filling of missing tones and applying a phase rotation on each 20 MHz sub-channel. In this case, the constructed VHT-LTF pattern may be defined as:

$VHTLTF_{-122,122}=\{c1.*[1,1,-1,-1,1,1,-1,1,1,1,1,1,1,$
$\quad 1-1,-1,1,1,[-1],1,-1,1,1,1,1,1],$ $c1.*[1,-1,-1,1,1,-1,1,-1,1,1,-1,-1,-1,-1,1,1,1-1,-1,$
$\quad 1,-1,[1],-1,1,1,1,1,1],$ $c1.*[[-1,-1,-1,1],\text{interp40NullL}(1)],c2.*$
$\quad [\text{interp40NullL}(2,3),[-1,1,1,-1]],$ $c2.*[1,1,-1,1,1,-1,1,-1,1,1,1,1,1,1,1,-1,-1,1,1,1,[1],$
$\quad 1,-1,1,1,1,1,1],$ $c2.*[1,-1,-1,1,1,-1,1,-1,1,-1,-1,-1,-1,1,1,-1,-1,1,$
$\quad 1,-1,[1],-1,1,1,1,1,1],$ $c2.*\text{interp80ExtraL},0,0,0,c3.*\text{interp80ExtraR},$ $c3.*[1,1,-1,-1,1,[-1],-1,1,-1,1,1,1,1,1,1,1,-1,-1,1,1,-$
$\quad 1,1,-1,1,1,1,1,1],$ $c3.*[1,-1,-1,1,1,-1,[-1],-1,1,-1,-1,-1,-1,1,1,1,-$
$\quad 1,-1,1,-1,1,1,-1,1,1,1,1,1],$ $c3.*[[-1,-1,-1,1],\text{interp40NullR}(1)],c4.*$
$\quad [\text{interp40NullR}(2,3),[-1,1,1,-1]],$ $c4.*[1,1,-1,-1,1,[1],-1,1,-1,1,1,1,1,1,1,1,-1,-1,1,1,-1,$
$\quad 1,-1,1,1,1,1,1],$ $c4.*[1,-1,-1,1,1,-1,[1],-1,1,-1,-1,-1,-1,1,1,1,-1,-$
$\quad 1,1,-1,1,1,-1,1,1,1,1,1]\}, \quad (15)$ where interp40NullL (3 tones), interp80ExtraL (4 tones), interp80ExtraR (4 tones), interp40NullR (3 tones) are extra tones, while interp40NullL and interp40NullR may not need to be identical; [c1 c2 c3 c4] is the phase rotation pattern comprising $\{+/-1,+/-j\}$ values. Missing tone values and the rotation pattern may be optimized for best PAPR.

A preferred VHT-LTF sequence constructed for transmission over 80 MHz channel based on the pattern defined by equation (15) may have a minimal worse case PAPR of 5.0722 dB (4-times oversampling with IFFT of size 1024) over all P and R values by using the phase rotation pattern [c1 c2 c3 c4]=[−1 1 1 1], or alternatively [1 −1 −1 −1], [−j j j j], [j −j −j −j], while the interpolating sequences may be [interp40NullL, interp80ExtraL, interp80ExtraR, interp40NullR]=[−1 1 1, −1 −1 1 −1, 1 −1 −1 1, 1 −1 1]. The entire VHT-LTF pattern (excluding phase rotation per 20 MHz sub-channel) is illustrated in FIG. 8B, where each row of the bit pattern 804 may correspond to one of the four 20 MHz sub-channels. For the preferred VHT-LTF sequence, the product of applied P and R values may be equal to $\exp(-j2\pi/3)$ or $\exp(-j4\pi/3)$.

In yet another aspect of the present disclosure, optimization of the VHT-LTF sequence may be performed by utilizing a new pilot pattern. Pilot values may be the same as the HT-LTF (High Throughput Long Training Field) values at the pilot tones. In this case, the 80 MHz subcarrier sequence for VHT-LTF may be constructed by using all 40 MHz 802.11n tones on both 40 MHz sub-channels, with filling of missing tones and applying a phase rotation on each 20 MHz sub-channel. The constructed VHT-LTF pattern may be defined as:

$$VHTLTF_{-122,122} = \{c1.*[1,1,-1,-1,1,1,-1,1,-1,1,1,1,1,1,\\1-1,-1,1,1,[-1],1,-1,1,1,1,1,1],$$

$$c1.*[1,-1,-1,1,1,-1,1,-1,1,-1,-1,-1,-1,1,1,1-1,-1,\\1,-1,[1],-1,1,1,1,1],$$

$$c1.*[[-1,-1,-1,1],\text{interp40NullL}(1)],c2.*\\ [\text{interp40NullL}(2,3),[-1,1,1,-1]],$$

$$c2.*[1,1,-1-,1,1,1,-1,1,-1,1,1,1,1,1,1,-1,-1,1,1,[-1],\\1,-1,1,1,1,1,1],$$

$$c2.*[1,-1,-1,1,1,-1,-1,1,-1,-1,-1,-1,1,1,1,-1,-1,\\1,-1,[1],-1,1,1,1,1],$$

$$c2.*\text{interp80ExtraL},0,0,0,c3.*\text{interp80ExtraR},$$

$$c3.*[1,1,-1,-1,1,[1],-1,1,-1,1,1,1,1,1,1,-1,-1,1,1,-1,\\1,-1,1,1,1,1,1],$$

$$c3.*[1,-1,-1,1,1,-1,[1],-1,1,-1,-1,-1,-1,-1,1,1,1,-1,-\\1,1,-1,1,-1,1,1,1,1],$$

$$c3.*[[-1,-1,-1,1],\text{interp40NullR}(1)],c4.*\\ [\text{interp40NullR}(2,3),[-1,1,1,-1]],$$

$$c4.*[1,1,-1,-1,1,[1],-1,1,-1,1,1,1,1,1,1,-1,-1,1,1,-1,\\1,-1,1,1,1,1,1],$$

$$c4.*[1,-1,-1,1,1,-1,[1],-1,1,-1,-1,-1,-1,-1,1,1,1,-1,-\\1,1,-1,1,-1,1,1,1,1,1]\}, \quad (16)$$

where interp40NullL (3 tones), interp80ExtraL (4 tones), interp80ExtraR (4 tones), interp40NullR (3 tones) are extra tones, while interp40NullL and interp40NullR may not need to be identical; [c1 c2 c3 c4] is the phase rotation pattern comprising $\{+/-1,+/-j\}$ values. Missing tone values and the rotation pattern may be optimized for best PAPR.

A preferred VHT-LTF sequence constructed for transmission over 80 MHz channel based on the pattern defined by equation (16) may have a minimal worse case PAPR of 5.2070 dB (4-times oversampling with IFFT of size 1024) over all P and R values by using the phase rotation [c1 c2 c3 c4]=[-1 1 1 1], or alternatively [1 -1 -1 -1], [-j j j j], [j -j -j -j], while the interpolating sequences may be [interp40NullL, interp80ExtraL, interp80ExtraR, interp40NullR]=[1 -1 1, 1 -1 1 -1, 1 -1 -1 1, 1 -1 1]. The entire VHT-LTF pattern (excluding phase rotation per 20 MHz sub-channel) is illustrated in FIG. 8C, where each row of the bit pattern 806 may correspond to one of the four 20 MHz sub-channels. For the preferred VHT-LTF sequence, the product of applied P and R values may be equal to $\exp(-j2\pi/3)$ or $\exp(-j4\pi/3)$.

Figure 9:
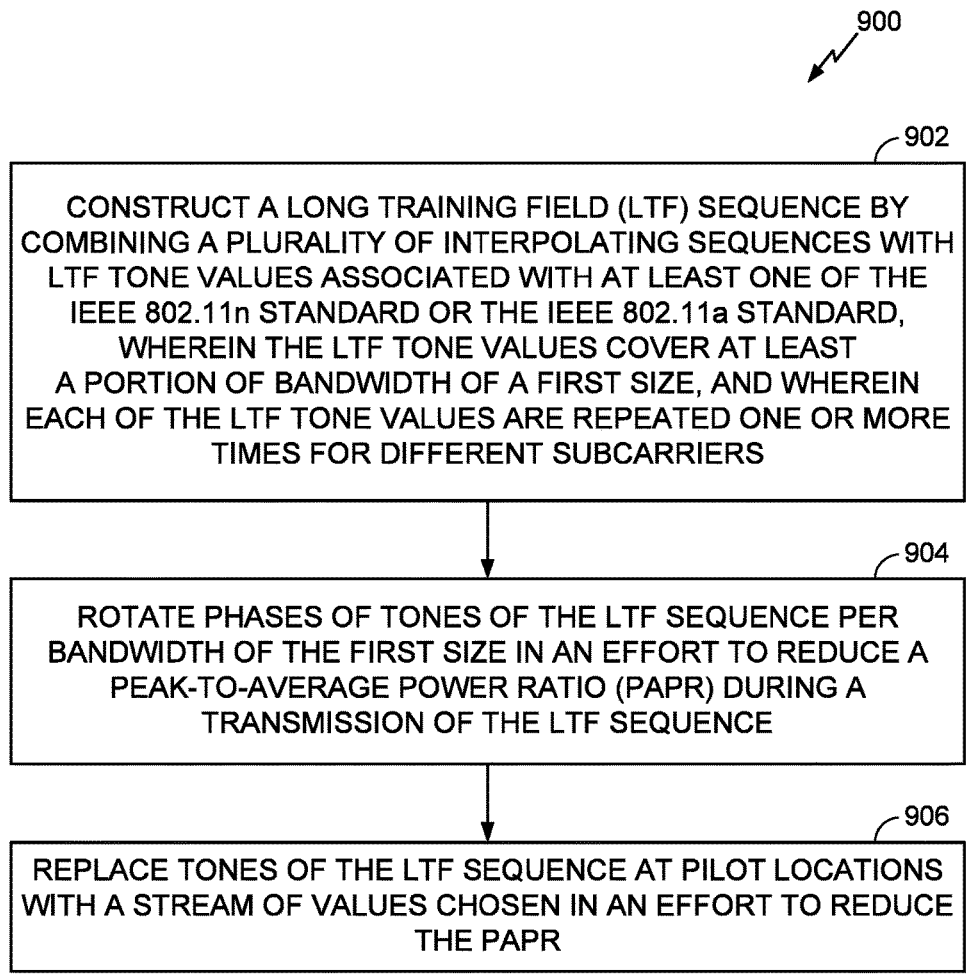
FIG. 9 illustrates example operations that may be performed at a wireless node for constructing a VHT-LTF sequence for transmission over 80 MHz channel in accordance with certain aspects of the present disclosure.

FIG. 9 illustrates example operations 900 for constructing the VHT-LTF sequence for transmission over 80 MHz channel in accordance with certain aspects of the present disclosure. In an aspect, the operations 900 may be performed at the access point 110 of the wireless communications system 100 from FIG. 1. At 902, the VHT-LTF sequence may be constructed by combining a plurality of interpolating sequences with LTF tone values associated with at least one of the IEEE 802.11n wireless communications standard or the IEEE 802.11a wireless communications standard, wherein the LTF tone values may cover at least a portion of bandwidth of a first size, and each of the LTF tone values may be repeated one or more times for different subcarriers. At 904, phases of tones of the VHT-LTF sequence may be rotated per bandwidth of the first size (e.g., with different values of c1, c2, c3 and c4 of rotational patterns [c1 c2 c3 c4] applied per 20 MHz sub-band) in an effort to minimize (or at least reduce) PAPR during a transmission of the VHT-LTF sequence. Further, phases of a plurality of tones of the LTF sequence may be rotated in an effort to reduce the PAPR, wherein the plurality of tones may belong to a portion of the bandwidth of a second size. At 906, tones of the VHT-LTF sequence at pilot locations may be replaced with a stream of values (e.g., with the stream 700 from FIG. 7A) chosen in an effort to reduce the PAPR.

In an aspect of the present disclosure, tones of the VHT-LTF sequence at non-pilot locations may be multiplied with one or more values (e.g., P-values), while tones of the VHT-LTF sequence at the pilot locations may be multiplied with one or more other values (e.g., R-values), wherein the one or more values and the one or more other values may be determined in an effort to reduce a largest PAPR among all PAPR results associated with the transmission of the VHT-LTF sequence.

The constructed VHT-LTF sequence may be transmitted over a wireless channel by utilizing the bandwidth of second size. In an aspect of the present disclosure, the bandwidth of first size may comprise at least one of a bandwidth of 20 MHz or a bandwidth of 40 MHz, and the bandwidth of second size may comprise a bandwidth of 80 MHz.

Phase Rotation Pattern for Legacy Part of Preamble

Referring back to FIG. 4, certain aspects of the present disclosure support several options for designing the Legacy Long Training Field (L-LTF) 406 and Legacy Short Training Field (L-STF) 404 of the legacy part 402 of the preamble 400 in an effort to reduce PAPR at a transmitting node. The legacy part of preamble may comprise a portion of the preamble recognizable by wireless nodes communicating according to previous, current and future wireless communications standards.

Certain aspects of the present disclosure support several cases how a phase rotation complementary sequence may be designed in an effort to reduce PAPR while transmitting at least on of the L-LTF and L-STF. In the first case, the phase rotation pattern may be given as c=[c(1) c(2) c(3) c(4)], where c(i)=1, -1, j, -j. This rotation pattern may have potential co-existence detection issue, depending on implementation. In the second case, the phase rotation pattern may be given as c=[a a*j b b*j], where a, b=1, -1, j, -j. In this case, there may be no co-existence detection issue. In the third case, the phase rotation pattern may be given as c=[1 j e d], where e, d=1, -1, j, -j, except d=e*j. This rotation pattern may also have potential co-existence detection issue, depending on implementation. In the fourth case, the phase rotation pattern may be given as c=[1 j b b*j], where b may be any complex number. In this case, there may be no co-existence detection issues.

FIG. 10A illustrates examples minimal PAPR results for each of the aforementioned four cases of designing the phase rotation pattern for constructing the L-LTF sequence in accordance with certain aspects of the present disclosure. It can be observed from FIG. 10A that the best PAPR result of 5.3962 dB may be achieved for the phase rotation pattern c=[c(1) c(2) c(3) c(4)]=[−1 1 1 1].

FIG. 10B illustrates examples minimal PAPR results for each of the aforementioned four cases of designing the phase rotation pattern for constructing the L-STF sequence in accordance with certain aspects of the present disclosure. It can be observed from FIG. 10B that the best PAPR result of 4.3480 dB may be achieved for the rotation pattern c=[c(1) c(2) c(3) c(4)]=[−1 1 1 1] or c=[c(1) c(2) c(3) c(4)]=[1 1 1 −1].

It can be observed from FIGS. 10A-10B that, for both L-LTF and L-STF sequences, the same phase rotation pattern of c=[c(1) c(2) c(3) c(4)]=[−1 1 1 1] may provide the best PAPR result. Further, the phase rotation pattern c=[1 j e d] (i.e., the third case) may result in slightly worse PAPR (i.e., less than 0.2, as given in FIG. 10A and FIG. 10B) by using rotation patterns [1 j −1 j] or [1 j 1 −j]. In addition, same phase rotation patterns applied on tones of at least one of the L-STF or the L-LTF (e.g., the phase rotation pattern of c=[−1 1 1 1]) may be also applicable to modify phases of tones in at least one of the L-SIG field 408 or the VHT-SIG-A fields 410, 412 of the legacy part 402 of the preamble 400 illustrated in FIG. 4 for achieving preferred PAPR results.

To summarize, the present disclosure provides a method and apparatus for constructing VHT-LTF sequences for transmission over 80 MHz channel in an effort to provide preferred PAPR results at a transmitting node. The VHT-LTF sequences may be constructed utilizing at least one of 40 MHz 802.11n LTF values, 20 MHz 802.11n LTF values or 20 MHz 802.11a LTF values, with appropriately chosen phase rotation per 20 MHz sub-band and with appropriately chosen extra subcarrier values in an effort to minimize (or at least reduce) PAPR.

The same aforementioned approach for constructing VHT-LTF sequences for 80 MHz channel bandwidth may be also used for other numbers of subcarriers. In an aspect of the present disclosure, for supporting IEEE 802.11ac wireless communication standard, a few tones at band edges may be zeroed out. In another aspect, all tones around DC may be utilized.

Figure 9A:
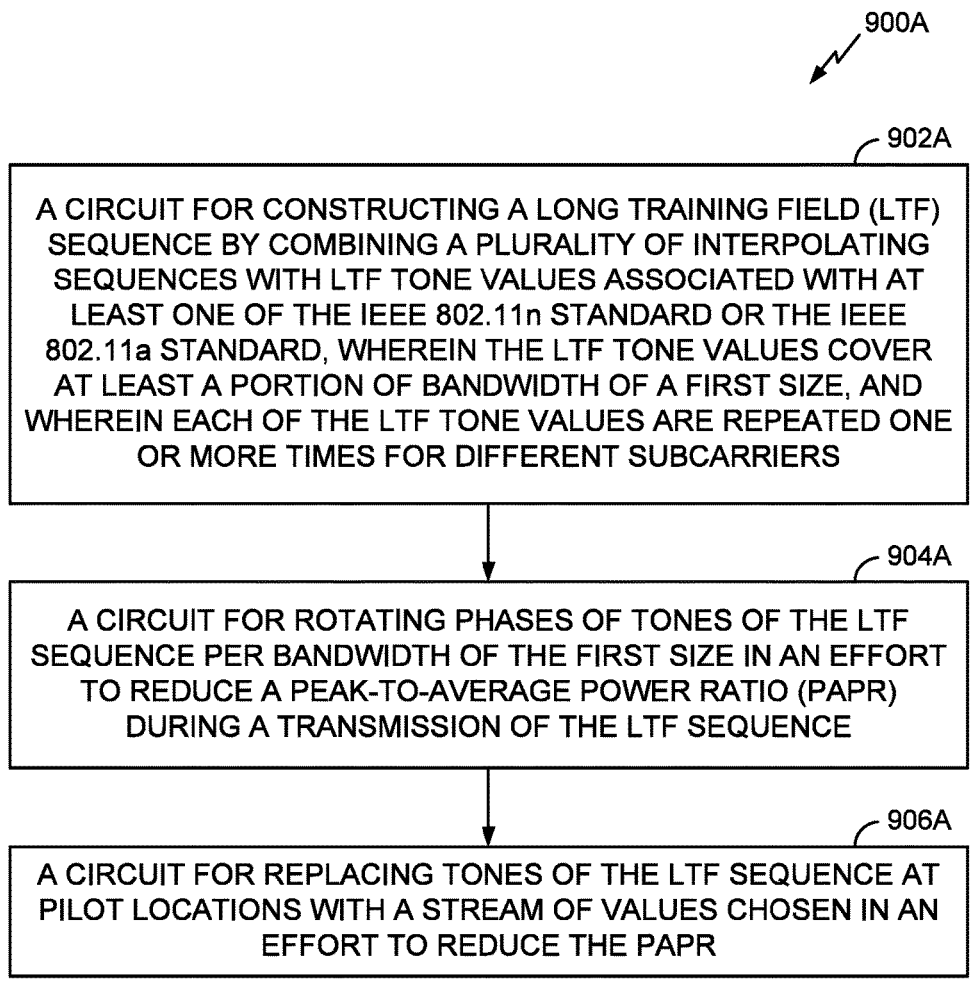
FIG. 9A illustrates example components capable of performing the operations illustrated in FIG. 9.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 900 illustrated in FIG. 9 correspond to components 900A illustrated in FIG. 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for constructing may comprise an application specific integrated circuit, e.g., the TX data processor 202 of the wireless node 200 from FIG. 2 or the processor 304 of the processing system 300 from FIG. 3. The means for rotating may comprise an application specific integrated circuit, e.g., the TX data processor 202 of the wireless node 200 or the processor 304 of the processing system 300. The means for replacing may comprise an application specific integrated circuit, e.g., the TX data processor 202 of the wireless node 200 or the processor 304 of the processing system 300. The means for transmitting may comprise a transmitter, e.g., the transceiver 206 of the wireless node 200. The means for designing may comprise an application specific integrated circuit, e.g., the TX data processor 202 of the wireless node 200 or the processor 304 of the processing system 300. The means for performing oversampling may comprise a sampling circuit, e.g., the transceiver 206 of the wireless node 200. The means for multiplying may comprise an application specific integrated circuit, e.g., the TX data processor 202 of the wireless node 200 or the processor 304 of the processing system 300. The means for utilizing may comprise an application specific integrated circuit, e.g., the TX data processor 202 of the wireless node 200 or the processor 304 of the processing system 300. The means for modifying may comprise an application specific integrated circuit, e.g., the TX data processor 202 of the wireless node 200 or the processor 304 of the processing system 300.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
   determining, at an apparatus, a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values;
   transmitting the preamble by the apparatus; and
   wherein the LTF sequence is transmitted within the preamble over a wireless channel by utilizing a bandwidth of a second size larger than the first size.

2. The method of claim 1, wherein the bandwidth of the second size comprises an 80 MHz band or a 160 MHz band.

3. An apparatus for wireless communications, comprising:
   a circuit configured to determine a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values;
   a transmitter configured to transmit the preamble; and
   wherein the circuit is further configured to:
   design the plurality of interpolating sequences in an effort to reduce a peak-to-average power ratio (PAPR) during a transmission of the LTF sequence.

4. An apparatus for wireless communications, comprising:
   a circuit configured to determine a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values;

a transmitter configured to transmit the preamble; and wherein the extra tone values include null tone values.

5. A method for wireless communications, comprising:

determining, at an apparatus, a long training field (LTF) sequence of a preamble that combines a plurality of interpolating sequences with LTF tone values, wherein the LTF tone values cover at least a portion of bandwidth of a first size, and each of the LTF tone values is repeated one or more times for different subcarriers, and wherein the plurality of interpolating sequences include extra tone values;

rotating, at the apparatus, phases of tones of the LTF sequence per bandwidth of the first size during a transmission of the LTF sequence; and replacing tones of the LTF sequence at pilot locations with a defined stream of values; and wherein the extra tone values include null tone values.

6. An apparatus for wireless communications, comprising:

a first circuit configured to determine a long training field (LTF) sequence of a preamble that combines a plurality of interpolating sequences with LTF tone values, wherein the LTF tone values cover at least a portion of bandwidth of a first size, and each of the LTF tone values is repeated one or more times for different subcarriers, and wherein the plurality of interpolating sequences include extra tone values;

a second circuit configured to rotate phases of tones of the LTF sequence per bandwidth of the first size during a transmission of the LTF sequence;

a third circuit configured to replace tones of the LTF sequence at pilot locations with a defined stream of values; and wherein the extra tone values include null tone values.

7. A method for wireless communications, comprising:

determining, at an apparatus, a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values;

transmitting the preamble by the apparatus; and wherein the determining the LTF sequence comprises:

designing the plurality of interpolating sequences in an effort to reduce a peak-to-average power ratio (PAPR) during a transmission of the LTF sequence.

8. A method for wireless communications, comprising:

determining a long training field (LTF) sequence that combines a plurality of interpolating sequences and one or more other sequences repeated multiple times in an effort to reduce a peak-to-average power ratio (PAPR) during a transmission of the determined LTF sequence, and wherein the plurality of interpolating sequences include extra tone values;

transmitting the determined LTF sequence over a wireless channel by utilizing a bandwidth of a first size; and wherein the extra tone values include null tone values.

9. A method for wireless communications, comprising:

determining, at an apparatus, a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values;

transmitting the preamble by the apparatus; and wherein the extra tone values include null tone values.

10. An apparatus for wireless communications, comprising:

a circuit configured to determine a long training field (LTF) sequence that combines a plurality of interpolating sequences and one or more other sequences repeated multiple times in an effort to reduce a peak-to-average power ratio (PAPR) during a transmission of the determined LTF sequence, and wherein the plurality of interpolating sequences include extra tone values;

a transmitter configured to transmit the determined LTF sequence over a wireless channel by utilizing a bandwidth of a first size; and wherein the extra tone values include null tone values.

11. An apparatus for wireless communications, comprising:

a circuit configured to determine a long training field (LTF) sequence of a preamble that combines a plurality of interpolating sequences with LTF tone values, wherein the LTF tone values cover at least a portion of bandwidth of a first size, each of the LTF tone values is repeated one or more times for different subcarriers, phases of tones of the LTF sequence are rotated per bandwidth of the first size, and certain tones of the LTF sequence have a stream of values at pilot locations, and wherein the plurality of interpolating sequences include extra tone values;

a transmitter configured to transmit the preamble; and wherein the LTF sequence is transmitted within the preamble over a wireless channel by utilizing a bandwidth of a second size larger than the first size.

12. The apparatus of claim 11, wherein the bandwidth of the second size comprises an 80 MHz band or a 160 MHz band.

13. A method for wireless communications, comprising:

determining a long training field (LTF) sequence that combines a plurality of interpolating sequences with LTF tone values associated with at least one of an Institute of Electrical and Electronics Engineers (IEEE) 802.11n standard or an IEEE 802.11a standard, wherein the LTF tone values cover at least a portion of bandwidth of a first size, and each of the LTF tone values is repeated one or more times for different subcarriers, and wherein the plurality of interpolating sequences include extra tone values;

rotating phases of tones of the LTF sequence per bandwidth of the first size in an effort to reduce a peak-to-average power ratio (PAPR) during a transmission of the LTF sequence;

transmitting the LTF sequence over a wireless channel by utilizing a bandwidth of a second size; and wherein the extra tone values include null tone values.

14. An apparatus for wireless communications, comprising:
- a first circuit configured to determine a long training field (LTF) sequence that combines a plurality of interpolating sequences with LTF tone values associated with at least one of an Institute of Electrical and Electronics Engineers (IEEE) 802.11n standard or an IEEE 802.11a standard, wherein the LTF tone values cover at least a portion of bandwidth of a first size, and each of the LTF tone values is repeated one or more times for different subcarriers, and wherein the plurality of interpolating sequences include extra tone values;
- a second circuit configured to rotate phases of tones of the LTF sequence per bandwidth of the first size in an effort to reduce a peak-to-average power ratio (PAPR) during a transmission of the LTF sequence;
- a transmitter configured to transmit the LTF sequence over a wireless channel by utilizing a bandwidth of a second size; and
- wherein the extra tone values include null tone values.

* * * * *